United States Patent
Ghoshal

(10) Patent No.: US 6,962,948 B2
(45) Date of Patent: Nov. 8, 2005

(54) SOLVENTLESS, NON-POLLUTING RADIATION AND THERMAL CURABLE COATINGS

(75) Inventor: Ramkrishna Ghoshal, Clifton Park, NY (US)

(73) Assignee: Polyset Company, Inc., Mechanicville, NY (US)

( * ) Notice: Subject to any disclaimer, the term of this patent is extended or adjusted under 35 U.S.C. 154(b) by 59 days.

(21) Appl. No.: 10/636,101

(22) Filed: Aug. 7, 2003

(65) Prior Publication Data

US 2005/0042458 A1 Feb. 24, 2005

(51) Int. Cl.$^7$ ................................................. C08F 2/46
(52) U.S. Cl. ........................ 522/31; 522/148; 427/387; 528/27; 523/425
(58) Field of Search ................... 522/31, 148; 427/387; 523/425; 528/27

(56) References Cited

U.S. PATENT DOCUMENTS

| | | | | |
|---|---|---|---|---|
| 5,073,643 A | | 12/1991 | Crivello | 556/64 |
| 5,260,349 A | | 11/1993 | Crivello | 522/31 |
| 5,650,474 A | | 7/1997 | Yamaya et al. | 528/12 |
| 5,757,313 A | | 5/1998 | Meneghini et al. | 347/262 |
| 5,863,970 A | * | 1/1999 | Ghoshal et al. | 523/434 |
| 6,069,259 A | | 5/2000 | Crivello | 549/214 |
| 6,602,602 B1 | * | 8/2003 | Crivello | 428/402 |
| 6,632,960 B2 | * | 10/2003 | Crivello et al. | 562/30 |
| 6,832,036 B2 | * | 12/2004 | Ghoshal et al. | 385/143 |
| 2002/0193619 A1 | | 12/2002 | Crivello et al. | 556/1 |

FOREIGN PATENT DOCUMENTS

WO    WO 98/33645    8/1998

OTHER PUBLICATIONS

Crivello, J. V. et al.; "The UV Cure of Epoxy–Silicone Monomers", *Polymeric Materials Science and Engineering*α, 217–227 (1989).

* cited by examiner

*Primary Examiner*—Margaret G. Moore
(74) *Attorney, Agent, or Firm*—Heslin Rothenberg Farley & Mesiti, P.C.; Martha L. Boden, Esq.

(57) ABSTRACT

Solventless siloxane epoxy-based coating compositions for use on metals, plastics, wood, and glass are disclosed. The compositions are cationically curable in air by heat or by electron beam radiation. The siloxane epoxy coating compositions exhibit excellent film properties after curing, such as good adhesion, flexibility, weatherability, and corrosion resistance even in the absence of a chromium-containing filler. The coating compositions may be clear or may contain fillers and/or pigments. A method for manufacturing a coated metal, plastic, wood, or glass substrate using the compositions is also disclosed, as well as the coated material manufactured by the method.

27 Claims, No Drawings

SOLVENTLESS, NON-POLLUTING RADIATION AND THERMAL CURABLE COATINGS

FIELD OF THE INVENTION

The present invention relates to solventless siloxane epoxy compositions, and more particularly to solventless siloxane epoxy compositions that are thermally curable or curable by electron beam radiation.

BACKGROUND OF THE INVENTION

High performance metal, plastic, wood, and glass coatings are used in both indoor and outdoor applications, such as in building products, appliances, transports, etc. Due to increasingly more stringent emission rules and increasing energy costs associated with coating conversion and pollution controls, it is preferable that such coatings contain 100% solids and no volatile organic compounds (zero VOC's). Unfortunately, however, most of the non-polluting coating systems currently being used last only about 30 years.

Problems associated with the use of solids systems on a commercial scale include mediocre coating performance, slow line speed, difficulty in adopting the systems, and/or high initial capital cost. Furthermore, the coatings may not be fully non-polluting and may contain unacceptable VOC levels. For these reasons, solid systems have been unsuccessful in replacing solvent-borne or water-solvent borne systems in the high volume coil-coating industry.

However, the present state-of-the-art non-polluting coatings have their own set of shortcomings and problems. For example, even low VOC (1–3 lbs/gal) water-borne coatings contain some solvents that must be incinerated before being emitted to the atmosphere. With respect to solid powder coatings (zero VOC), associated handling problems often make them unsuitable for a high speed flat stock, coil-coating line. Furthermore, ultraviolet (U.V.) curable coatings, which are 100% solids, zero VOC, can be used only for non-pigmented coatings or thin film pigmented applications, such as for printing inks. In addition, the performance of U.V. curable coatings is in general inferior to that of thermally cured coatings in the areas of adhesion, U.V. stability, corrosion resistance, and weatherability, which are very important properties for use in building products and in automotive applications.

Thermal curing is also often unsuitable because of the impractical long oven length needed for the curing oven. A long oven is required because the thermal curing rate, i.e., conversion rate of the coating, for converting low viscosity monomers and oligomers to solid polymers is very slow. However, conversion to the solid state, which provides tack-free, dry coatings can be completed quickly by simply evaporating the solvent from the solid resin solution. Thus, the present state-of-the-art thermal systems employ this technique. Most thermal curing coating chemistries are based on solution, emulsion, or dispersion of solid resins or very high viscosity resins (high molecular weight thermoplastic or thermostat resins), which involve very little or no curing (solidification). However, one disadvantage associated with this type of solid/high viscosity resin is that the use of solvents or co-solvents is required, and thus, the materials contain VOC's. In addition, as is commonly known, low molecular weight, low viscosity monomers can also evaporate from the line, especially when heated at high temperatures and when present in thin films. Thus, even if the coatings meet the requirements under the present VOC definition, the coating line will still generate organic vapor emission of a different kind, i.e. from the monomers.

Electron beam (E-beam or E.B.) curable coatings, which contain 100% solids and zero VOC, can be used for pigmented coatings, unlike U.V. curable coatings. However, current E-beam coatings suffer from the same performance limitations as do U.V. curable coatings, when compared with thermal systems. This is largely because the same resin and curing chemistries (acrylates) are employed in existing E-beam curable coatings as in the U.V. materials. Additional costs incurred with radiation (both U.V. & E-beam) curable acrylate coatings include those associated with the use of nitrogen blanketing. However, of the currently available curing processes, E-beam irradiation is the most preferable for high speed coating lines when compared with thermal curing or U.V. curing.

Alternate available cationic curing (U.V. & E.B.) epoxy chemistry coating compositions do not require nitrogen blanketing, but the cure rates of currently available epoxies are very slow when compared with acrylates. In addition, a soft, tacky surface is left outside the area irradiated by the beam, which is unacceptable in a high speed, low dose line. Furthermore, various processing and performance limitations have made them undesirable for use in Original Equipment Manufacture (OEM) markets, such as in appliances, building products, and automotives, etc. Thus, until now, radiation curable (U.V. & E.B.) coatings have not been a good alternate technology for providing zero VOC, pollution-free coatings for coil coatings. Furthermore, current filled and pigmented coatings typically include the use of an environmentally unfavorable chromate filler in order to pass corrosion testing.

Therefore, a need exists for a cationic curable epoxy resin coating chemistry, which meets the process and performance parameters of coil coatings in OEM markets. Preferably, the viscosities of the monomers and oligomers should be low enough to formulate a highly filled and/or pigmented coating (up to 65% by weight) without the use of any solvents, and the coating should also be able to meet the application viscosity (less than 3000 cps) of a high speed reverse roll coating system, i.e. greater than 400 FPM.

In addition, it is desirable that certain economic and performance parameters be met. Thus, the resin chemistry of such coil coatings should be fully compatible with commonly used pigments and fillers, thereby providing formulations with minimum restrictions. It would also be environmentally advantageous if chromate-containing pigments could be eliminated as an ingredient.

Furthermore, to be useful in coating metal, plastic, wood, and glass substrates, the coatings should meet industry standards for each of the application areas in terms of adhesion, flexibility, gloss, weathering, corrosion, etc. Also, the coating chemistry should be suitable for high speed, low dose E-beam cure lines and alternatively, for thermal curing, such that the materials can be immediately rolled into coils without any coating lift up problem, with or without nitrogen blanketing.

SUMMARY OF THE INVENTION

The present invention meets the aforementioned needs and avoids the problems associated with available metal, plastic, wood, or glass coatings. The invention is predicated on the unexpected discovery of a new cationically curable resin chemistry based on novel siloxane epoxy resins. These novel resins can be cured by heat or by E-beam radiation and can be cured in air without the need for nitrogen blanketing. This is advantageous because the cost of maintaining an inert atmosphere can contribute substantially to the overall cost of curing by radiation. For use in coil coating applications, the compositions can be immediately rolled into coils without any coating lift up problem.

The coatings of the present invention are solventless and therefore, contain zero VOC's, making them desirable for use in industry because they do not present any health hazards before polymeric conversion. In addition, the unique resins of the present invention are surprisingly superior to currently available coatings because they contain 100% solids, can be cured by high speed, low dose, E-beam radiation or thermally, and can be used as metal, plastic, wood, or glass coatings for both indoor and outdoor applications. Other advantages of the present compositions over currently available resins include excellent and improved cured film properties, such as exhibiting good adhesion, flexibility (tough without being brittle), weatherability, and unexpectedly good corrosion resistance even in the absence of a chromium-containing filler.

The coating compositions may be clear or may contain fillers and/or pigments. Accordingly, in one aspect, the present invention is a clear coating composition comprising from about 90 to about 100 parts by weight of a base resin; from 0 to about 2 parts by weight of an adhesion promoter and from about 3 to about 8 parts by weight of a cationic polymerization initiator. The base resin comprises:

(A) from about 30 to about 50 parts by weight of a cycloaliphatic epoxy functional siloxane monomer having structure (IA)

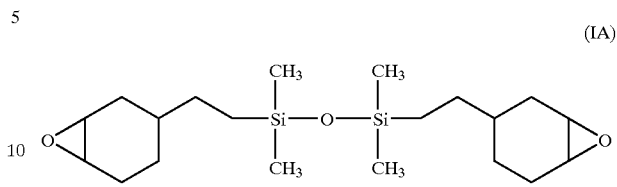

(B) from about 5 to about 30 parts by weight of a cycloaliphatic epoxy functional siloxane oligomer having structure (IB)

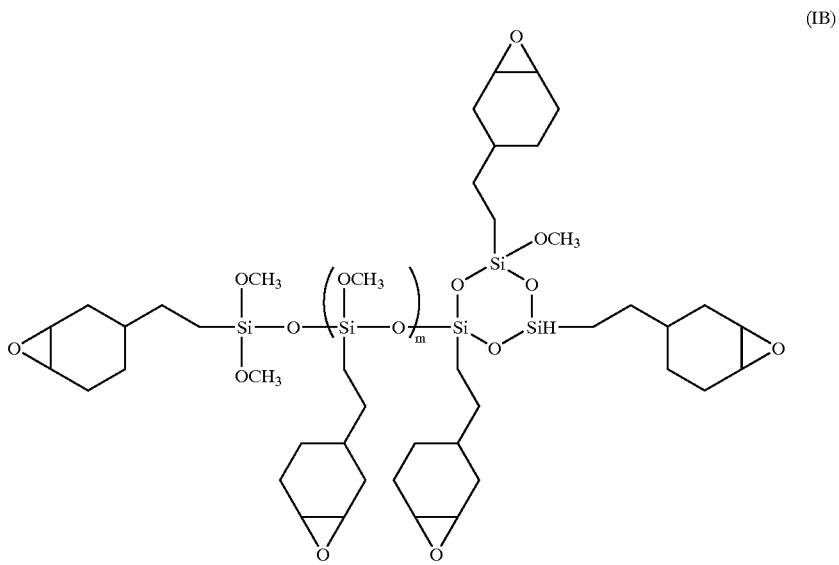

wherein m is an integer having a value from 5 to 50;

(C) from about 20 to about 50 parts by weight of at least one non-silicon-containing epoxy resin selected from the group consisting of (i) epoxidized vegetable oils, (ii) epoxidized vegetable oil esters, and (iii) 3,4-epoxycyclohexylmethyl-3',4'-epoxycyclohexane carboxylate having structure (IIA)

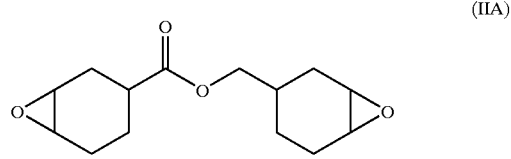

(D) from 0 to about 30 parts by weight of one or more flexibilizers selected from the group of (i) epoxides based on a diglycidyl ether of bisphenol A having structure (IIB)

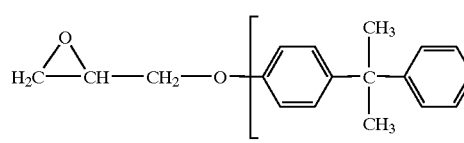 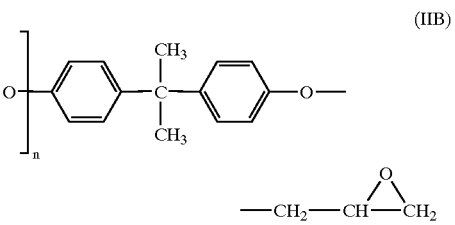

(IIB)

wherein the average value of n is 0 or about 0.07, 0.14, 2.3 or 4.8; (ii) epoxidized alpha olefins; (iii) limonene oxides; (iv) thermoplastic acrylic resins; (v) elastomers; (vi) phenoxy resins; (vii) polyol flexibilizers; and (viii) allyl ethers. The cationic polymerization initiator comprises at least one diaryliodonium salt, wherein each diaryliodonium salt is present in a corresponding separate catalyst solution comprising from about 40 to about 80 wt. % of a carrier medium and from about 20 to about 60 wt. % of the diaryliodonium salt or salts. Each diaryliodonium salt has structure (III)

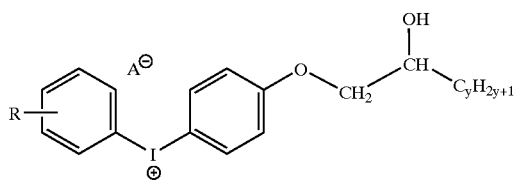

(III)

wherein R is methyl or hydrogen; y is 0 or an integer from 1 to 25; and $A^-$ is a non-nucleophilic anion selected from the group consisting of $[BF_4]^{31}$, $[PF_6]^{31}$, $[AsF_6]^-$, $[SbF_6]^-$, $[B(C_6F_5)_4]^-$, and $[Ga(C_6F_5)_4]^-$.

In another aspect, the present invention is a coating composition comprising from about 35 to about 62 parts by weight of the aforementioned base resin; from about 32 to about 65 parts by weight of one or more components selected from the group consisting of fillers, pigments, diluents, tougheners, flow control agents, and antifoaming agents; from 0 to about 1 part by weight of an adhesion promoter and from about 2 to about 5 parts by weight of a cationic polymerization initiator, as previously described. Formulations containing fillers and/or pigments, as well as any of the other aforementioned components, are useful as primers or topcoats.

In another aspect, the invention is a method for manufacturing a coated article. The first step of the method involves applying either the aforementioned clear coating composition or the coating composition containing fillers, pigments, diluents, tougheners, flow control agents, and/or antifoaming agents, as previously described, to an article made of wood, glass, plastic, or metal. In the second step, the composition deposited on the article may be exposed to E-beam radiation or to thermal energy. When the composition and article are exposed to E-beam radiation, the radiation generally ranges from about 3 to about 12 Mrad. When thermal curing is employed, the article and composition are heated to a first maximum substrate temperature ranging from about 150° C. to about 260° C. Polymerization occurs to >90% during the exposure to E-beam radiation or heating to the first maximum substrate temperature. Optionally, after polymerization, the coated article may be heated to a second maximum substrate temperature ranging from about 80° C. to about 125° C.

In yet another aspect, the invention is a coated article manufactured by the previously described method.

DESCRIPTION OF THE PREFERRED EMBODIMENTS

The present siloxane epoxy coating compositions, whether pigmented, filled, or clear, include a base resin, an adhesion promoter and a cationic polymerization initiator. The filled/pigmented coatings additionally include fillers, pigments, diluents, tougheners, flow control agents, and/or antifoaming agents. By altering the catalyst level, these epoxy resin coatings can be cured by E-beam radiation or thermally to give the desired processing parameters and excellent cured film properties described herein in terms of adhesion, flexibility, weatherability, corrosion resistance, etc. However, the mere combination of these ingredients or similar ingredients followed by thermal heating or E-beam radiation does not guarantee a cured coating having excellent cured film properties. Instead, it is the amount of each specific component taken together as a whole that provides the unexpectedly superior cured coatings of the present invention.

The base resin includes a cycloaliphatic epoxy functional siloxane monomer having structure (IA), an optional cycloaliphatic epoxy functional siloxane oligomer having structure (IB), one or more non-silicon containing epoxy resins, and optional flexibilizers. The clear, unfilled coating compositions contain from about 90 to about 100 parts by weight of the base resin relative to the total weight of the formulation, and the total weight of the pigmented and/or filled compositions contain from about 35 to about 62 parts by weight of the base resin.

Cycloaliphatic epoxy functional siloxane monomer having structure (IA) has the chemical name 1,1,3,3-tetramethyl-1,3-bis[2-(7-oxabicyclo[4.1.0]hept-3-yl)ethyl] disiloxane and has a molecular weight of 376 g/mole. Siloxane (IA) is commercially available from Polyset Company Inc., Mechanicville, N.Y. as PC1000. Siloxane oligomer (IB), wherein m is an integer from 5 to 50, has a molecular weight ranging from about 1000 to about 10,000 g/mole and is commercially available from Polyset in its PC2000 series, e.g., PC2000, PC2003, PC2000HV. In both the clear and filled/pigmented coating formulations, cycloaliphatic epoxy functional siloxane (IA) is incorporated into the base resin in amounts ranging from about 30 to about 50 parts by weight of the total base resin, and siloxane (IB), in amounts ranging from 0 to 30 parts by weight.

Also included in the base resin of the present coating formulations are from about 20 to about 50 parts by weight of one or more non-silicon-containing epoxy resins. Suitable non-silicon-containing epoxy resins include epoxidized vegetable oils and epoxidized vegetable oil esters, such as VIKOFLEX® 9010, which is a methyl epoxy linseedate available from Atofina Chemicals, Inc. Another suitable non-silicon containing epoxy resin is a cycloaliphatic epoxy, such as 3,4-epoxycyclohexylmethyl-3',4'-epoxycyclohexane carboxylate (EECH), also known as 7-oxabicyclo[4.1.0] hept-3-ylmethyl 7-oxabicyclo[4.1.0]heptane-3-carboxylate). EECH has structure (IIA) and is commercially available from Union Carbide as ERL 4221. Of these, epoxidized vegetable oil esters are generally preferred.

Optionally, the base resin may include up to about 30 parts by weight of one or more flexibilizers, which provide flexibility to the compositions. Suitable flexibilizers include epoxides having structure (IIB) above, which are based on a diglycidyl ether of bisphenol A. Examples include ARALDITE® 6084 and ARALDITE® 6097, which are available from Ciba Geigy in solid form. VIKOLOX® 14, which is a C-14 epoxidized alpha olefin available from Elf Atochem, is another suitable flexibilizer. Polyol flexibilizers, such as caprolactan triol, which is available from Solvay Interox, Inc. as CAPA® 4101 (previously sold as CAPA® 316) are also suitable. CAPA® 4101 has the chemical name 2-oxepanone and is a polymer of 2-2-bis(hydroxymethyl)-1,3-propanediol having the chemical formula ($C_6H_{10}O_2$ $C_5H_{12}O_4$). Additional useful flexibilizers include thermoplastic acrylic resins, such as DEGALAN® 64/12 and DEGALAN® P24, which are available from Rohm, limonene oxides, such as limonene dioxide available from Elf Atochem; elastomers; and phenoxy resins. Allyl ethers are also useful flexibilizers, and examples include vinyl ethers and propenyl ethers available from ISP, BASF, etc. Other suitable flexibilizers would be obvious to those of skill, and the invention is not limited to the flexibilizers described herein.

One preferred base resin for use in the present clear formulations contains from about 35 to about 40 parts by weight of the siloxane monomer having structure (IA), from 0 to about 15 parts by weight of the siloxane oligomer having structure (IB), but more preferably 10 parts, from about 28 to about 40 parts by weight of the non-silicon-containing epoxy resin(s), and from about 9 to about 17 parts by weight of the epoxide based on a diglycidyl ether of bisphenol A having structure (IIB). For use in the filled or pigmented coatings, a preferred base resin contains from about 40 to about 45 parts by weight of the siloxane monomer having structure (IA), from about 5 to about 15 parts by weight of the siloxane oligomer having structure (IB), but more preferably 10 parts, from about 32 to about 40 parts by weight of the non-silicon-containing epoxy resin(s), and from about 5 to about 10 parts by weight of the epoxide based on a diglycidyl ether of bisphenol A having structure (IIB). Preferably, the non-silicon-containing epoxy resin in these compositions is an epoxidized vegetable oil, such as VIKOFLEX® 9010.

In addition to the base resin, the present compositions may optionally include an adhesion promoter. In clear formulations, up to about 2 parts by weight of the adhesion promoter may be added for improved adhesion to metal. However, in filled and/or pigmented compositions, up to about 1 part by weight is sufficient to provide good adhesion to the cured films. Exemplary adhesion promoters include, but are not limited to, epoxy alkoxysilanes, such as 2-(3,4-epoxycyclohexyl)-ethyl trimethoxysilane and 3-glycidyloxypropyltrimethoxysilane, both of which are available from Witco Corporation as A186 and A187, respectively.

The filled and pigmented coating formulations also contain from about 32 to about 65 parts by weight of fillers, pigments, diluents, tougheners, flow control agents, and/or antifoaming agents. Examples of such ingredients include, but are not limited to, titanium dioxide pigments; such as $TiO_2$ 2160, $TiO_2$ 2310, $TiO_2$ 2020, and the like available from Kronos, Inc.; talc (magnesium silicate hydroxide), such as Nytal 300, which is available from R. T. Vanderbilt; ceramic microspheres, such as Zeospheres™ microspheres, available from 3M as G-400 and G-200; antifoaming agents (foam suppressants), such as BYK® 501 available from BYK Chemie USA, Inc.; wetting agents, such as Silwet® L-7604 available from OSI Specialities; grinding agents, such as BYK® 307, available from BYK Chemie USA, Inc.; and hydrophobic fumed silica, such as Aerosil® R972, available from Degussa-Hüls. Substitution with other similar fillers, pigments, diluents, tougheners, flow control agents, antifoaming agents, and additives will be obvious to those of skill in the coating arts.

One unexpected and surprising advantage of the present pigmented/filled compositions over currently available primer and topcoat resins is that excellent corrosion resistance is exhibited even in the absence of a chromate or phosphate additive. By contrast, current commercial coatings must include such anticorrosion ingredients, such as zinc chromate, strontium chromate, zinc phosphate, or strontium phosphate to pass corrosion testing. Because the use of these materials is an important environmental concern, elimination thereof in the compositions described herein makes the present coatings far more desirable than any coatings previously available.

Other surprising and unexpected features of the filled and pigmented formulations described herein are that: 1) a pretreatment of the metal substrate (chemical conversion coating to improve adhesion and corrosion resistance) prior to applying the primer may be eliminated in certain applications; and 2) a pigmented topcoat may be applied directly to the substrate without applying a primer coat. Thus, use of the present formulations is more economical and simpler than those currently available because two steps may be eliminated, if desired. Furthermore, as previously mentioned, the primers and topcoats are environmentally friendly without the inclusion of chromates or phosphates.

A cationic polymerization initiator is also included in the present coatings prior to curing, both thermally and by E-beam irradiation. The clear formulations contain from about 3 to about 8 parts by weight of the cationic polymerization initiator solution based on the total weight of the composition, and the filled/pigmented coatings include for curing from about 2 to about 5 parts by weight of the cationic polymerization initiator solution.

The cationic polymerization initiator contains one or more diaryliodonium salts, each having the following formula (III):

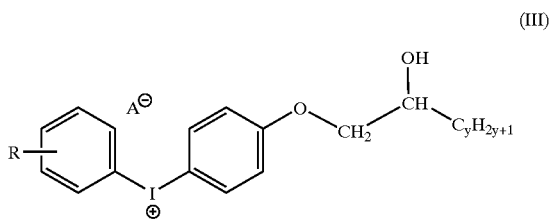

wherein R is methyl or hydrogen, and y is 0 or an integer from 1 to 25. When R is methyl, the methyl substituent may be located at any position of the aryl ring, i.e., at the 2, 3, or 4-carbon relative to the carbon attached to the iodine atom, which is identified as the 1-carbon. The 2-, 3-, and 4-carbon positions are also known as ortho-, meta-, and para-, as anyone of ordinary skill would know. A⁻ is a non-nucleophilic anion, commonly [BF$_4$]⁻, [PF$_6$]⁻, [AsF$_6$]⁻, [SbF$_6$]⁻, [B(C$_6$F$_5$)$_4$]⁻, or [Ga(C$_6$F$_5$)$_4$]⁻. It should be noted that a negatively charged moiety is conventionally indicated herein by a minus sign, either in a circle or without the circle. Each symbol is used interchangeably, and may be positioned as a superscript relative to the moiety. Similarly, a positively charged moiety is denoted by a plus symbol, with or without the circle.

Each selected diaryliodonium salt is separately dissolved in a carrier medium, which may be a monomer, to form a respective catalyst solution containing from about 20 to about 60 wt. % of the selected diaryliodonium salt and from about 40 to about 80 wt. % of the selected carrier medium. Exemplary carriers include monomers such as 3,4-epoxycyclohexylmethyl-3',4'-epoxycyclohexane carboxylate (EECH)(structure (IIA)) and bis(3,4-epoxycyclohexyl) adipate. However, the invention is not limited to these carriers, and other suitable carrier mediums would be obvious to one of ordinary skill. Bis(3,4-epoxycyclohexyl) adipate, which is available from Union Carbide as ERL 4299, has the following structure:

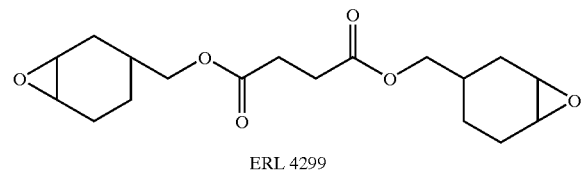

ERL 4299

One catalyst solution embodiment contains about 40 wt. % of the diaryliodonium salt and about 60 wt. % 3,4-epoxycyclohexylmethyl-3',4'-epoxycyclohexane carboxylate (EECH) or bis(3,4-epoxycyclohexyl)adipate, but more preferably, EECH.

Especially suitable diaryliodonium salts for use in polymerizing the present compositions are: [4-(2-hydroxy-1-tetradecyloxy)-phenyl]phenyliodonium hexafluorophosphate having structure (IIIA); [4-(2-hydroxy-1-tetradecyloxy)-phenyl] 4-methylphenyliodonium hexafluorophosphate having structure (IIIB); [4-(2-hydroxy-1-tetradecyloxy)-phenyl]phenyliodonium hexafluoroantimonate having structure (IIIC); amd [4-(2-hydroxy-1-tetradecyloxy)-phenyl] 4-methylphenyliodonium hexafluoroantimonate having structure (IIID):

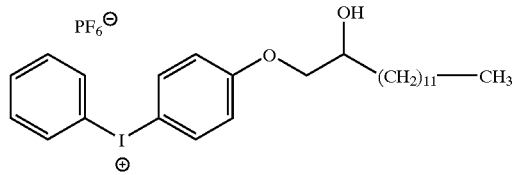

(IIIA)

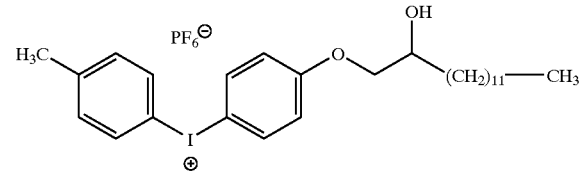

(IIIB)

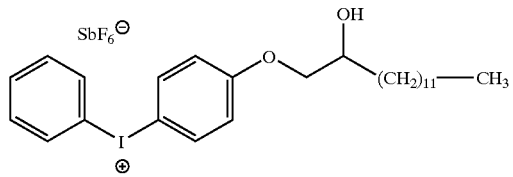

(IIIC)

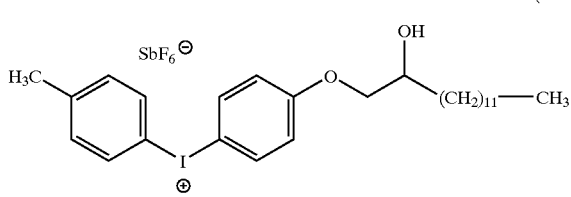

(IIID)

The fluorophosphate and fluoroantimonate diaryliodonium salt catalysts having structures (IIIA), (IIIB), (IIIC), and (IIID) are commercially available from Polyset Company, respectively, as PC-2508, PCX-2519, PC-2506, and PCX-2509. The most preferred fluorophosphate diaryliodonium salt is that of structure (IIIA), and the most preferred fluoroantimonate diaryliodonium salt is that of structure (IIIC)

Thus, in the final formulations, the polymerization initiator includes at least one diaryliodonium salt in a catalyst solution, but most preferably one or more of the aforementioned fluorophosphate or fluoroantimonate diaryliodonium salts in solution. The amount and identity of the cationic polymerization initiator is dependent upon whether the formulation is to be cured thermally or by E-beam radiation. When the composition is to be cured by E-beam radiation, an all phosphate iodonium catalyst solution may be suitable in some applications to provide satisfactory adhesion and performance after cure. An all antimonate iodonium catalyst may provide films that are very dry after E-beam irradiation, but in some cases such films may have inadequate adhesion and may exhibit some brittleness. By contrast, for thermal curing, an all antimonate iodonium catalyst solution provides a satisfactory cure and results in films that are dry, but not brittle, and not tacky. With either type of curing, however, it is often preferable to use a blend of phosphate/antimonate iodonium catalyst solutions to provide dry films with good adhesion. The identity and amount of catalyst can be adjusted depending on the type of curing to be done, as well as on the application and substrate.

In the clear, unfilled formulations, the cationic polymerization initiator preferably contains up to about 8 parts by weight of the fluorinated iodonium phosphate catalyst solution alone, up to about 4 parts by weight of the fluorinated iodonium antimonate catalyst solution alone, or a blend of the phosphate/antimonate solutions, such that the final formulation contains a total cationic polymerization initiator ranging from about 3 to about 8 parts by weight of the total composition. When a blend is used, an exemplary cationic polymerization initiator for use in E-beam or thermal curing contains a 50/50 (wt. %) blend of each fluorophosphate and fluoroantimonate iodonium salt catalyst solution, i.e., equal parts by weight of each catalyst solution. Generally, the amount of each catalyst solution ranges from about 2 to about 4 parts by weight (e.g., 2 parts of the fluoroantimonate iodonium salt catalyst solution and 2 parts of the fluorophosphate iodonium salt catalyst solution). For E-beam curing, another suitable blend contains about 3 parts by weight of the iodonium phosphate catalyst solution and about 1 part of the iodonium antimonate catalyst solution. Another suitable blend for E-beam curing contains about 4 parts by weight of the iodonium phosphate catalyst solution and about 2 parts by weight of the iodonium antimonate catalyst solution. In addition, an all iodonium phophate catalyst solution, generally ranging from about 4 to about 8 parts by weight of the final formulation is suitable for E-beam curing. For thermal curing, another initiator includes from about 2 to about 4 parts by weight of the iodonium antimonate catalyst solution without any iodonium phosphate catalyst. As mentioned above, each catalyst is preferably present in a 40/60 (wt. %) solution of the iodonium salt in EECH, bis(3,4-epoxycyclohexyl)adipate, or other carrier medium, but most preferably EECH. The resulting films after curing exhibit good adhesion and are dry without being brittle.

In the filled and pigmented compositions, the cationic polymerization initiator preferably contains up to about 4.4 parts by weight of the fluorinated phosphate iodonium catalyst solution alone, up to about 4 parts by weight of the fluorinated antimonate iodonium catalyst solution alone, or a blend of the phosphate/antimonate catalyst solutions, such that the final formulation contains a total cationic polymerization initiator ranging from about 2 to about 5 parts by weight of the total composition. A 50/50 (wt. %) blend of each fluorophosphate and fluoroantimonate iodonium salt catalyst solution is suitable when curing by either heat or E-beam radiation. Generally, when equal parts by weight of each catalyst are used, the amount of each catalyst solution ranges from about 1 to about 2.5 parts by weight (e.g., 1 part of the fluorantimonate iodonium salt catalyst solution and 1 part of the fluorophosphate iodonium salt catalyst solution). For E-beam curing a suitable blend contains about 3 parts of the iodonium phosphate catalyst solution and about 1 part of the iodonium antimonate catalyst solution. Another suitable polymerization initiator for E-beam curing contains from about 2 to about 4 parts by weight of the iodonium phosphate catalyst solution and no iodonium antimonate catalyst solution. By contrast, for thermal curing a preferred cationic polymerization initiator includes from about 2 to about 4 parts by weight of the iodonium antimonate catalyst solution alone without any iodonium phosphate catalyst. Again, each catalyst is preferably present in a 40/60 (wt. %) solution of the iodonium salt in EECH, bis(3,4-epoxycyclohexyl) adipate, or other suitable carrier medium, but most preferably EECH.

As mentioned above, the catalyst solutions and blends included in both the filled/pigmented and unfilled, clear formulations may be adjusted according to the type of curing desired. For thermal curing, an antimonate iodonium catalyst solution may be used alone, or some of it may be replaced with a phosphate iodonium catalyst solution. For E-beam curing, most preferably, some or all of the antimonate iodonium catalyst solution may be replaced with the phosphate iodonium catalyst solution. Exemplary embodiments are found in, but not limited to, the formulations provided in the examples provided herein.

It should also be noted that in some situations, the film may be slightly soft after curing. The composition may then be baked in air at a temperature for a time sufficient to obtain a film with desirable properties. As used herein, the term "postbake" refers to such a drying step. A typical postbake, which raises the substrate temperature to about 80° C.–125° C. for a period ranging from about 15 minutes to about an hour, is therefore often preferred for improving cured film properties. Generally, an improvement in adhesion is observed regardless of the type and source of the substrate (Al or steel, cleaned or not cleaned, treated or not treated, etc.).

As previously mentioned, the addition of anticorrosion chromium-containing materials to currently available metal coatings is becoming more and more questionable because of environmental concerns. In addition, chromates are undesirable for use in the compositions described herein because the cationic cure system is acidic, whereas chromates are basic. Any basic type material will react with the catalyst, thereby reducing or completely destroying the catalyst reactivity. This is especially true in the E.B. curing system. However, in a thermal cure system, some of these basic fillers and pigments may be used in the present compositions with an all antimonate iodonium catalyst (IIIC) or (IIID), but the amount of the catalyst must be increased accordingly to drive the reaction to completion. Examples of common basic fillers include zinc chromate, strontium chromate, zinc phosphate, strontium phosphate, clay, etc.

The present invention also includes a method for manufacturing a coated article, as well as the coated article manufactured by the method. As used herein, the term "article" includes a wood, glass, plastic, or metal substrate. Applications include decorative, insulating, or protective coatings on such materials. In the method, a filled/pigmented or unfilled, clear formulation, as described herein, is first deposited onto the article by conventional techniques known in the art, such as spray or roll coating. Next, the composition applied to the article is cured by being exposed to E-beam radiation ranging from about 3 to about 12 Mrad. Alternatively, the composition on the article may be thermally cured by heating the article to a temperature ranging from about 150° C. to about 260° C. This temperature corresponds to the maximum temperature of the substrate in the curing oven (or on the hotplate). When the substrate or article is a metal, the term "peak metal temperature" or "PMT" is often used in connection with this maximum substrate temperature. Upon curing, the composition is polymerized to >90%. Furthermore, as previously described and if desired, the coated article may be subjected to a postbake step to improve the properties of the coating.

The following examples are given by way of illustration and are not intended to be limitative of the present invention. Various combinations of resins (siloxanes and non-siloxane epoxies), flexibilizers, adhesion promoters, catalysts, etc., which provide the unexpected and desired cure speed and film properties, after straight thermal curing or after E-beam exposure (with or without postbake) are provided in the examples. In addition, the reagents used in the formulations described herein are readily available materials. Such materials can be conveniently prepared in accordance with conventional preparatory procedures or obtained from commercial sources.

In the exemplary formulations cured by E-beam radiation, all panels were cured in air using an AEB Lab Electron Beam Machine at a voltage between 80–120 Kv and a dose ranging from 4–12 Mrad, without any nitrogen blanket. In the thermally cured examples, all panels were cured on a hot plate or in a convection oven for 1–2 minutes at a temperature ranging from about 150° C. to about 260° C. PMT, but typically at 177° C. PMT for 2 minutes or 205° C. PMT for 1 minute. Post-curing, denoted in the examples as "postbake", was done in an airflow convection oven (15 min. to 1 hour at 125° C. PMT).

Initially, all coatings were evaluated on standard flashing grade aluminum (available in hardware stores), then extended to treated aluminum and steel panels from Q-panels. Furthermore, some of the coating formulations (both clear and pigmented) were evaluated on substrates specifically obtained from metal industries. Unless otherwise noted, no surface pre-treatment was done other than cleaning the surface with methylene chloride or isopropanol or whatever was performed by metal panel suppliers. The following explanations correspond to the substrates used in the examples:

Flashing=Regular hardware store roof flashing;
AL 36=Q-Panel of aluminum with a chromate pretreatment;
R 36-1=Q-Panel of steel with Bondrite 1000 iron phosphate P60 chrome and deionized water rinse;
Al 3000=Aluminum panel, 3000 series
Clean=Aluminum panel, 5000 series;
Chrome=Aluminum panel, 5000 series, with a chrome conversion coating;
Non-Chrome=Aluminum panel, 5000 series, with a non-chrome conversion coating;
Galv.=Galvanized steel panel;
Treated Galv.=Galvanized steel panel with a phosphate pretreatment;
Galvalume=Galvalume coated steel panel with no pretreatment
HDGT=hot dipped Galvanized treated steel panel with Bondrite Included in the following examples are one or more film properties measured for each formulation after curing, such as set to touch (in box and after 5-sec), appearance (cured film), adhesion (ASTM D-3359), bend test (ASTM D-522-88), pencil hardness, etc. Some of the tests (adhesion and bend) were repeated up 96 hours later. In addition the viscosity of some of the formulations was measured prior to curing. Also, some of the panels were later subjected to humidity, salt-fog and U.V. resistance tests. With respect to the bend and adhesion tests, "pass" indicates that the material stayed adhered to the substrate and that there was no cracking. "Fail" indicates that the material cracked or delaminated from the panel.

Clear, Unfilled Formulations

Following are exemplary formulations for clear coatings curable by E-beam radiation or thermally (by adjusting the catalyst level). The formulations provide the desirable processing parameters and film properties described herein.

EXAMPLE 1

Thermal Cure

A formulation containing the following components was prepared and tested:

| Formulation 1 | |
|---|---|
| Component | Parts by Weight |
| 4221 | 30 |
| PC-1000 | 30 |
| PC-2003 | 30 |
| Capa 316/4101 | 10 |
| Silane A-187 | 2 |
| PC-2506 (40%) | 3 |
| PC-2508 (40%) | — |

| | Aluminum Substrate, 5000 Series | | |
|---|---|---|---|
| | Clean | Chrome | Non-Chrome |
| Thermally Cured-Hotplate 177 C. 2 min Appearance | | | |
| Fish Eye | None | None | None |
| Color | Clear | Clear | Clear |
| Cure | Dry | Dry | Dry |
| Adhesion Test (ASTM D 3359 Cross Hatch) | | | |
| After 24 hrs. | Pass | Pass | Pass |
| 1T Bend Test (ASTM D 522-88) | | | |
| After 24 hrs. | Pass | Pass | Pass |

EXAMPLE 2

Thermal Cure

Formulations containing the following components were prepared and tested:

| | Formulation | | |
|---|---|---|---|
| | 2A | 2B | 2C |
| Component | Parts by Weight | | |
| 6084/4221 (20/80) | 30 | — | 30 |
| 6084/4221 (30/70) | — | 30 | — |
| PC-1000 | 30 | 30 | 30 |
| PC-2003 | 30 | 30 | 30 |
| Capa316/4101 | 10 | 10 | 10 |
| Silane A-187 | 2 | 2 | 2 |
| PC-2506 (40%) | 3 | 3 | 1 |
| PC-2508 (40%) | — | — | 3 |

| | Formulation | | | | | |
|---|---|---|---|---|---|---|
| | 2A | 2A | 2A | 2B | 2B | 2B |
| Aluminum Substrate, 5000 Series | Clean | Chrome | Non-Chrome | Clean | Chrome | Non-Chrome |
| Thermally Cured-Hotplate 177° C. 2 min. Appearance | | | | | | |
| Fish Eye | None | None | None | None | None | None |

-continued

| | | | | | | |
|---|---|---|---|---|---|---|
| Color | Clear | Clear | Clear | Clear | Clear | Clear |
| Cure | Dry | Dry | Dry | Dry | Dry | Dry |
| Adhesion Test (ASTM D 3359 Cross Hatch) | | | | | | |
| After 24 hrs | Pass | Pass | Pass | Pass | Pass | Pass |
| 1T Bend Test (ASTM D 522-88) | | | | | | |
| After 24 hrs. | Pass | Pass | Pass | Pass | Pass | Pass |

Thermal and E-Beam Cure with and without Postbake

Formulation 2C

| | Aluminum Substrate, 5000 Series | | | | | | Other Substrate | |
|---|---|---|---|---|---|---|---|---|
| | Clean | Chrome | Non Chrome | Chrome | Non Chrome | Non Chrome | Galvalume | AL 36 |
| Thermally Cured | | | | | | | | |
| Hotplate 177 C. 2 min | Yes | Yes | Yes | No | No | No | No | No |
| E-Beam Cured | | | | | | | | |
| Voltage (Kv) | N/A | N/A | N/A | 120 | 120 | 120 | 120 | 120 |
| Dose (Mrad) | N/A | N/A | N/A | 6 | 6 | 6 | 6 | 6 |
| Postbaked 125° C. 15 min | N/A | N/A | N/A | Yes | No | Yes | No | No |
| Appearance | | | | | | | | |
| Fish eye | None | None | None | None | None | None | None | None |
| Clarity | Clear | Clear | Clear | Clear | Clear | Clear | Clear | Clear |
| Cure | Dry | Dry | Dry | Dry | Dry | Dry | Dry | Dry |
| Adhesion Test (ASTM D3359 Cross Hatch) | | | | | | | | |
| After 24 hrs. | Pass | Pass | Pass | Pass | Pass | Pass | Pass | Pass |
| After 48 hrs. | | | | Pass | Pass | Pass | | |
| 1T Bend Test (ASTM D 522-88) | | | | | | | | |
| After 24 hrs. | Pass | Pass | Pass | Pass | Pass | Pass | Pass | Pass |

EXAMPLE 3

Thermal Cure- or E-Beam Cure with Postbake

Formulations containing the following components were prepared and tested:

| | Formulation | | | | |
|---|---|---|---|---|---|
| Component | 3A | 3B | 3C | 3D | 3E |
| | Parts by Weight | | | | |
| Vikoflex 9010/ Araldite 6097 (70/30) | 56 | 53 | 50 | — | 40 |
| Vikoflex 9010/ Araldite 6084 (80/20) | — | — | — | 46 | — |
| PC-1000 | 40 | 38 | 36 | 35 | 40 |
| PC-2003 | — | 5 | 10 | 15 | 10 |
| Silane A187 | 2 | 2 | 2 | 2 | 2 |
| Byk 501 | — | — | — | 0.2 | — |
| PC-2506 (40%) | 2 | 2 | 2 | 2 | 2 |
| PC-2508 (40%) | — | — | — | — | 6 |

| | Formulation | | | | | |
|---|---|---|---|---|---|---|
| | 3A | | | | 3B | |
| Aluminum | Clean | Clean | Clean | Non- | Non- | Lighting | Lighting |

-continued

| | | | | Chrome | Chrome | Non-Chrome | Non-Chrome |
|---|---|---|---|---|---|---|---|
| Substrate, 5000 Series | | | | | | | |
| | | | Thermally Cured | | | | |
| Hotplate 203° C. | 1 min. 30 sec. | 1 min. 30 sec. | 1 min. 30 sec. | 1 min. 45 sec. | 1 min. 45 sec. | 1 min. 45 sec. | 1 min. 45 sec. |
| Postbaked 125° C. | 1 hour | 15 min | 30 min. | 15 min | 30 min. | 15 min | 30 min. |
| | | | Appearance | | | | |
| Cure | Dry | Dry | Dry | Dry | Dry | Dry | Dry |
| | | | Impact Test (ASTM D 2794) after 24 hours | | | | |
| 20 in./lbs. | — | — | — | Pass | Pass | Pass | Pass |
| 30 in./lbs | — | — | — | Pass | Fail | Fail | Fail |

| | Formulation | | | |
|---|---|---|---|---|
| | 3C | | | 3D |
| Aluminum Substrate, 5000 Series | Clean | Clean | Clean | Clean | Clean |
| | Thermally Cured | | | |
| Hotplate 203° C. | 1 min. 30 sec. | 1 min. 45 sec. | 1 min. 45 sec. | 1 min. 10 sec. | 1 min. 15 sec. |
| Postbaked 125° C. | 1 hour | 15 min | 30 min. | 1 hour | 1 hour. |
| | Appearance | | | |
| Cure | Dry | Dry | Dry | Cheesy | Dry |
| | Impact Test (ASTM D 2794) after 24 hours | | | |
| 20 in./lbs. | Pass | — | — | — | — |
| 30 in./lbs | Pass | — | — | — | — |

| | Formulation 3E | | |
|---|---|---|---|
| Aluminum Substrate, 5000 Series | Non-Chrome | Non-Chrome | Non-Chrome |
| | E-Beam Cured | | |
| Voltage (Kv) | 120 | 120 | 120 |
| Dose (Mrad) | 6 | 6 | 6 |
| Postbaked 125° C. | 30 min. | 15 min. | 30 min. |
| | Appearance | | |
| Cure | Dry | Dry | Dry |
| | Impact Test (ASTM D 2794) after 24 hours | | |
| 20 in./lbs. | Pass | Pass | Pass |
| 30 in./lbs | Pass | Pass | Pass |

EXAMPLE 4

E-Beam Cure- with and Without Postbake

Formulations containing the following components were prepared and tested:

| | Formulation | | | |
|---|---|---|---|---|
| | 4A | 4B | 4C | 4D |
| Component | Parts by Weight | | | |
| Araldite 6084/ 4221 (20/80) | 40 | — | 35 | — |
| Araldite 6084/ 4221 (30/70) | — | 40 | — | 35 |
| PC-1000 | 30 | 30 | 30 | 30 |
| PC-2003 | 30 | 30 | 30 | 30 |
| Capa 316/4101 | — | — | 5 | 5 |
| Silane A187 | 2 | 2 | 2 | 2 |
| PC-2506 (40%) | 1 | 1 | 1 | 1 |
| PC-2508 (40%) | 3 | 3 | 3 | 3 |

Postbaked After the E-Beam Cure:

| | Formulation | | | | | |
|---|---|---|---|---|---|---|
| | 4A | | | 4B | | |
| AluminumSubstrate, 5000 Series | Clean | Chrome | Non Chrome | Clean | Chrome | Non Chrome |
| E-Beam Cured | | | | | | |
| Voltage (Kv) | 120 | 120 | 120 | 120 | 120 | 120 |
| Dose (Mrad) | 6 | 6 | 6 | 6 | 6 | 6 |
| Postbaked 125° C. 15 min | Yes | Yes | Yes | Yes | Yes | Yes |
| Appearance | | | | | | |
| Fish eye | None | None | None | None | None | None |
| Clarity | Clear | Clear | Clear | Clear | Clear | Clear |
| Cure | Dry | Dry | Dry | Dry | Dry | Dry |
| Adhesion Test (ASTM D3359 Cross Hatch) | | | | | | |
| After 24 hrs. | Pass | Pass | Pass | Pass | Pass | Pass |
| After 48 hrs. | Pass | Pass | Pass | Pass | Pass | Pass |
| After 72 hrs. | Pass | Pass | Pass | Pass | Pass | Pass |
| 1T Bend Test (ASTM D 522-88) | | | | | | |
| After 24 hrs. | Pass | Pass | Pass | Pass | Pass | Pass |
| After 48 hrs. | Pass | Pass | Pass | Pass | Pass | Pass |
| After 72 hrs. | Pass | Pass | Pass | Pass | Pass | Pass |

| | Formulation | | | | | |
|---|---|---|---|---|---|---|
| | 4C | | | 4D | | |
| AluminumSubstrate 5000 Series | Clean | Chrome | Non Chrome | Clean | Chrome | Non Chrome |
| E-Beam Cured | | | | | | |
| Voltage (Kv) | 120 | 120 | 120 | 120 | 120 | 120 |
| Dose (Mrad) | 6 | 6 | 6 | 6 | 6 | 6 |
| Postbaked 125° C. 15 min | Yes | Yes | Yes | Yes | Yes | Yes |
| Appearance | | | | | | |
| Fish eye | None | None | None | None | None | None |
| Clarity | Clear | Clear | Clear | Clear | Clear | Clear |
| Cure | Dry | Dry | Dry | Dry | Dry | Dry |
| Adhesion Test (ASTM D3359 Cross Hatch) | | | | | | |
| After 24 hrs. | Pass | Pass | Pass | Pass | Pass | Pass |
| After 48 hrs. | Pass | Pass | Pass | Pass | Pass | Pass |
| After 72 hrs. | Pass | Pass | Pass | Pass | Pass | Pass |
| 1T Bend Test (ASTM D 522-88) | | | | | | |
| After 24 hrs. | Pass | Pass | Pass | Pass | Pass | Pass |
| After 48 hrs. | Pass | Pass | Pass | Pass | Pass | Pass |
| After 72 hrs. | Pass | Pass | Pass | Pass | Pass | Pass |

Comparative Example—No Postbake

The same tests were run on Formulations 4A–4D on the same substrates, except the samples weren't postbaked. The samples still passed the adhesion and bend tests, but their top surfaces were soft and tacky without the postbake.

EXAMPLE 5

E-Beam Cure

A formulation containing the following components was prepared and tested:

| Formulation 5 | |
|---|---|
| Component | Parts by Weight |
| Araldite 6084/4221 (30/70) | 45 |
| PC-1000 | 45 |
| Silane A187 | 2 |
| PC-2506 (40%) | 4 |
| PC-2508 (40%) | 4 |

-continued

| Formulation 5 | | |
|---|---|---|
| | Substrate | |
| | Flashing | AL-36 |
| E-Beam Cured | | |
| Voltage (Kv) | 80 | 80 |
| Dose (Mrad) | 6 | 6 |
| Postbaked 125° C. 15 min | No | No |
| Appearance | | |
| Fish eye | None | None |
| Clarity | Clear | Clear |
| Cure | Dry | Dry |
| Adhesion Test (ASTM D3359 Cross Hatch) | | |
| After 24 hrs. | Pass | Pass |
| 1T Bend Test (ASTM D 522-88) | | |
| After 24 hrs. | Pass | Pass |

EXAMPLE 6

E-Beam Cure

Formulations containing the following components were prepared and tested:

| | Formulation | |
|---|---|---|
| | 6A | 6B |
| Component | Parts by Weight | |
| 4221 | 40 | 40 |
| PC-1000 | 40 | 40 |
| Capa 316/4101 | 10 | 10 |
| Silane A187 | 2 | 2 |
| PC-2506 (40%) | 2 | 4 |
| PC-2508 (40%) | 6 | 4 |

| | Formulation | |
|---|---|---|
| | 6A | 6B |
| | Substrate | |
| | AL-36 | AL-36 |
| E-Beam Cured | | |
| Voltage (Kv) | 120 | 120 |
| Dose (Mrad) | 6 | 6 |
| Postbaked 125° C. 15 min | No | No |
| Appearance | | |
| Fish eye | None | None |
| Clarity | Clear | Clear |
| Cure | Dry | Dry |
| Adhesion Test (ASTM D3359 Cross Hatch) | | |
| After 24 hrs. | Pass | Pass |
| 1T Bend Test (ASTM D 522-88) | | |
| After 24 hrs. | Pass | Fail |

Note that without a postbake, Formulation 6B failed the bend test. Although desirable, it is not always necessary for the coating material to pass the bend test if sharp bends will not be made. One skilled in the art will be familiar with which coil coating applications require sharp bends and will therefore determine whether or not to perform a postbake.

EXAMPLE 7

E-Beam Cure

A formulation containing the following components was prepared and tested:

| Formulation 7 | |
|---|---|
| Component | Parts by Weight |
| Araldite6084/ 4221 (20/80) | 45 |
| PC-1000 | 45 |
| Silane A187 | 2 |
| PC-2506 (40%) | 4 |
| PC-2508 (40%) | 4 |

| | Substrate |
|---|---|
| | AL-36 |
| Voltage (Kv) | 120 |
| Dose (Mrad) | 6 |
| Postbaked 125° C. 15 min | No |
| Appearance | |
| Fish eye | None |
| Clarity | Clear |
| Cure | Dry |
| Adhesion Test (ASTM D3359 Cross Hatch) | |
| After 24 hrs. | Pass |
| 1T Bend Test (ASTM D 522-88) | |
| After 24 hrs. | Pass |

EXAMPLE 8

E-Beam Cure

A formulation containing the following components was prepared and tested:

| Formulation 8 | |
|---|---|
| Component | Parts by Weight |
| Araldite6084/ 4221 (20/80) | 40 |
| PC-1000 | 30 |
| PC-2003 | 30 |
| Silane A187 | 2 |
| PC-2506 (40%) | 4 |
| PC-2508 (40%) | 4 |

| | Substrate |
|---|---|
| | AL-36 |
| E-Beam Cured | |
| Voltage (Kv) | 120 |
| Dose (Mrad) | 6 |
| Postbaked 125° C. 15 min | No |
| Appearance | |
| Fish eye | None |
| Clarity | Clear |
| Cure | Dry |
| Adhesion Test (ASTM D3359 Cross Hatch) | |
| After 24 hrs. | Pass |
| 1T Bend Test (ASTM D 52288) | |
| After 24 hrs. | Fail |

As previously mentioned, depending on the application, passing the bend test is not always necessary. One of ordinary skill in the art will be able to make this determination and can determine whether or not to perform a postbake step.

EXAMPLE 9

E-Beam Cure

Formulations containing the following components were prepared and tested:

| Component | Formulations | |
|---|---|---|
| | 9A | 9B |
| | Parts by Weight | |
| Araldite6084/ 4221 (30/70) | 40 | 40 |
| PC-1000 | 30 | 30 |
| PC-2003 | 30 | 30 |
| Silane A187 | 2 | 2 |
| PC-2506 (40%) | 2 | 4 |
| PC-2508 (40%) | 6 | 4 |
| Substrate | | |
| | AL-36 | AL-36 |
| E-Beam Cured | | |
| Voltage (Kv) | 120 | 120 |
| Dose (Mrad) | 6 | 6 |
| Postbaked 125° C. 15 min | No | No |
| Appearance | | |
| Fish eye | None | None |
| Clarity | Clear | Clear |
| Cure | S. Grab | Dry |
| Adhesion Test (ASTM D3359 Cross Hatch) | | |
| After 24 hrs. | Pass | Pass |
| 1T Bend Test (ASTM D 522-88) | | |
| After 24 hrs. | Pass | Fail |

Once again, one of skill will be able to determine whether the material must pass the bend test.

EXAMPLE 10

E-Beam Cure

Formulations containing the following components were prepared and tested:

| Component | Formulation | | | |
|---|---|---|---|---|
| | 10A | 10B | 10C | 10D (from table 14 |
| | Parts by Weight | | | |
| 4221 | 30 | 50 | 50 | 30 |
| PC-1000 | 30 | 40 | 40 | 30 |
| PC-2003 | 30 | — | — | 30 |
| Capa 316/4101 | 10 | 10 | 10 | 10 |
| Silane A186 or 187 | 2 | 2 | 2 | 2 |
| PC-2506 (40%) | 2 | 2 | 2 | — |
| PC-2508 (40%) | 4 | 4 | — | — |
| PC-2519 (40%) | — | — | 4 | 8 |
| Viscosity | 395 | 135 | 136 | 402 |

-continued

| | Formulation | | | |
|---|---|---|---|---|
| | 10A | 10B | 10C | 10D |
| | Substrate | | | |
| | Flashing | Flashing | Flashing | Flashing |
| E-Beam Cured | | | | |
| Voltage (Kv) | 120 | 120 | 120 | 120 |
| Dose (Mrad) | 6 | 6 | 6 | 6 |
| Set to Touch | Dry | Dry | Dry | Dry |
| Appearance | | | | |
| Fish eye | None | None | None | None |
| Clarity | Clear | Clear | Clear | Clear |
| Adhesion Test (ASTM D3359 Cross Hatch) | | | | |
| After 24 hrs. + 1 hour at 125° C. | Pass | Pass | Pass | Pass |
| 1T Bend Test (ASTM D 522-88) | | | | |
| After 24 hrs. | Pass | Pass | Pass | Pass |
| Pencil Hardness | 6H | 6H | 6H | — |

Primer Formulations (Filled)

Following are exemplary primer formulations containing fillers. The formulations are curable by E-beam radiation or by thermal energy (by adjusting the catalyst level) and provide the desirable processing parameters and film properties described herein.

EXAMPLE 11

E-Beam Cure

Primer Formulations with and Without Postbake

Base resin (I) having the following composition was prepared:

| Component | Parts by Weight |
|---|---|
| Araldite6084/ 4221 (20/80) | 45 |
| PC-1000 | 45 |
| PC-2003 | 10 |

Primer formulations containing Base Resin (I) and the following other components were prepared and tested:

| | Formulation | | |
|---|---|---|---|
| | 11A | 11B | 11C |
| Component | Parts by Weight | | |
| Base Resin (I) | 48 | 48 | 48 |
| Byk 307 | 0.4 | 0.4 | 0.4 |
| Silwet L-7604 | 0.4 | 0.4 | 0.4 |
| Zeospheres G-200 | 46 | 46 | 46 |
| Silane A-187 | 1 | 1 | 1 |
| Byk 501 | 0.2 | 0.2 | 0.2 |
| PC-2506 (40%) | 2 | 1 | — |
| PC-2508 (40%) | 2 | 3 | 4 |
| Viscosity | 3755 | 3755 | 3755 |

| | Formulation | | | | | | | |
|---|---|---|---|---|---|---|---|---|
| | 11A | | | | 11B | | | |
| | Substrate | | | | | | | |
| | AL 36 | AL 36 | R 36 1 | R 36 1 | AL 36 | AL 36 | R 36 1 | R 36 1 |
| | E-Beam Cured | | | | | | | |
| Voltage (Kv) | 120 | 120 | 120 | 120 | 120 | 120 | 120 | 120 |
| Dose (Mrad) | 6 | 6 | 6 | 6 | 6 | 6 | 6 | 6 |
| Postbaked 125° C. 15 min | no | yes | no | yes | no | yes | no | yes |
| | Appearance | | | | | | | |
| Fish eye | None | None | None | None | None | None | None | None |
| Cure | Dry | Dry | Dry | Dry | Dry | Dry | Dry | Dry |
| | Adhesion Test (ASTM D3359 Cross Hatch) | | | | | | | |
| After 24 hrs. | Pass | Pass | Pass | Pass | Pass | Pass | Pass | Pass |
| | 1T Bend Test (ASTM D 522-88) | | | | | | | |
| After 72 hrs. | Pass | Pass | Pass | Pass | Pass | Pass | Pass | Pass |

| | Formulation 11C | | | |
|---|---|---|---|---|
| | Substrate | | | |
| | AL 36 | AL 36 | R 36 1 | R 36 1 |
| | E-Beam Cured | | | |
| Voltage (Kv) | 120 | 120 | 120 | 120 |
| Dose (Mrad) | 6 | 6 | 6 | 6 |
| Postbaked 125° C. 15 min | no | yes | no | yes |
| | Appearance | | | |
| Fish eye | None | None | None | None |
| Cure | Dry | Dry | Dry | Dry |
| | Adhesion Test (ASTM D3359 Cross Hatch) | | | |
| After 24 hrs. | Pass | Pass | Pass | Pass |
| | 1T Bend Test (ASTM D 522-88) | | | |
| After 72 hrs. | Pass | Pass | Pass | Pass |

EXAMPLE 12

Thermal Cure

Primer Formulation with Postbake

Base resin (II) having the following composition was prepared:

| Component | Parts by Weight |
|---|---|
| Vikoflex 9010 | 42 |
| PC-1000 | 43 |
| PC-2003 | 15 |

A primer formulation containing Base Resin (II) and the following other components were prepared and tested:

Formulation 12

| Component | Parts by Weight |
|---|---|
| Base Resin (II) | 36 |
| Byk 307 | 0.4 |
| Zeospheres G-200 w/187 0.5% | 60 |
| Silane A187 | 1 |
| Byk 501 | 0.2 |
| PC-2506 (40%) | 2.5 |
| PC-2508 (40%) | — |

| Substrate | | | |
|---|---|---|---|
| Al 3000 | Galvalume | Galv. | HDGT |

Thermally Cured Hotplate 205° C. –1 min

| | | | | |
|---|---|---|---|---|
| Postbaked 125° C. 15 min. | yes | yes | yes | yes |

Appearance

| | | | | |
|---|---|---|---|---|
| Cure | Dry | Dry | Dry | Dry |

Adhesion Test (ASTM D3359 Cross Hatch)

| | | | | |
|---|---|---|---|---|
| After 24 hrs. | Pass | Pass | Fail | Pass |

1T Bend Test (ASTM D 522-88)

| | | | | |
|---|---|---|---|---|
| After 72 hrs. | Pass | Pass | Fail | Pass |

EXAMPLE 13

E-Beam Cure and Thermal Cure Primer Formulations

Base resin (III) having the following composition was prepared:

| Component | Parts by Weight |
|---|---|
| Araldite6084/4221 (20/80) | 50 |
| PC-1000 | 50 |

Primer formulations containing Base Resin (III) and the following other components were prepared and tested:

| | Formulation | | |
|---|---|---|---|
| | 13A | 13B | 13C |
| Component | Parts by Weight | | |
| Base Resin (III) | 48 | 48 | 48 |
| Byk 307 | 0.4 | 0.4 | 0.4 |
| Silwet L-7604 | 0.4 | 0.4 | 0.4 |
| Zeospheres G-200 | 46 | 46 | 46 |
| Silane A-187 | 1 | 1 | 1 |
| Byk 501 | 0.2 | 0.2 | 0.2 |
| PC-2506 (40%) | 2 | 1 | 2 |
| PC-2508 (40%) | 2 | 3 | — |
| Viscosity | 1966 | 1966 | 1966 |

| Substrate | | | | | | | | |
|---|---|---|---|---|---|---|---|---|
| AL 36 | AL 36 | R 36 1 | R 36 1 | AL 36 | AL 36 | R 36 1 | AL 36 | R 36 1 |

Thermally Cured

| | | | | | | | | | |
|---|---|---|---|---|---|---|---|---|---|
| Hotplate 205° C. 1 min | No | No | No | No | No | No | No | Yes | Yes |

E-Beam Cured

| | | | | | | | | | |
|---|---|---|---|---|---|---|---|---|---|
| Voltage (Kv) | 120 | 120 | 120 | 120 | 120 | 120 | 120 | N/A | N/A |
| Dose (Mrad) | 6 | 6 | 6 | 6 | 6 | 6 | 6 | N/A | N/A |
| Postbaked 125° C. 15 min. | No | yes | no | yes | no | yes | no | no | no |

Appearance

| | | | | | | | | | |
|---|---|---|---|---|---|---|---|---|---|
| Fish eye | None | None | None | None | None | None | None | None | None |
| Cure | Dry | Dry | Dry | Dry | Dry | Dry | Dry | Dry | Dry |

Adhesion Test (ASTM D3359 Cross Hatch)

| | | | | | | | | | |
|---|---|---|---|---|---|---|---|---|---|
| After 24 hrs. | Pass | Pass | Pass | Pass | Pass | Pass | Pass | Pass | Pass |

1T Bend Test (ASTM D 522-88)

| | | | | | | | | | |
|---|---|---|---|---|---|---|---|---|---|
| After 24 hrs. | Pass | Pass | Pass | Pass | Pass | Pass | Pass | Pass | Pass |

EXAMPLE 14

E-Beam Cure

Primer Formulations

Primer formulations containing Base Resin (III) from Example 13 and the following other components were prepared and tested:

|  | Formulation | |
|---|---|---|
|  | 14A | 14B |
| Component | Parts by Weight | |
| Base Resin (III) | 40 | 40 |
| Byk 307 | 0.4 | 0.4 |
| Zeospheres G-200 | 55 | 35 |
| Nytal 300 | — | 25 |
| Silane A187 | 1 | 1 |
| Byk 501 | 0.1 | 0.1 |
| PC-2506 (40%) | 1 | 1 |
| PC-2508 (40%) | 2.5 | 2.5 |

| | Formulation | | | | | |
|---|---|---|---|---|---|---|
| | 14A | | | 14B | | |
| | Substrate | | | | | |
| | AL 36 | AL 36 | AL 36 | AL 36 | AL 36 | AL 36 |
| | E-Beam Cured | | | | | |
| Voltage (Kv) | 120 | 120 | 120 | 120 | 120 | 120 |
| Dose (Mrad) | 6 | 6 | 6 | 6 | 6 | 6 |
| Postbaked 125° C. | No | 15 min. | 1 hour | No | 15 min. | 1 hour |
| | Appearance | | | | | |
| Fish eye | None | None | None | None | None | None |
| Cure | Dry | Dry | Dry | Dry | Dry | Dry |
| | Adhesion Test (ASTM D3359 Cross Hatch) | | | | | |
| After 25 days | Pass | Pass | Pass | Pass | Pass | Pass |
| | 1T Bend Test (ASTM D 522-88) | | | | | |
| After 25 days | Micro-crack | Micro-crack | Micro-crack | Pass | Pass | Pass |

EXAMPLE 15

E-Beam Cure

Primer Formulations

Primer formulations containing Base Resin (III) from Example 13 and the following other components were prepared and tested:

|  | Formulation | |
|---|---|---|
|  | 15A | 15B |
| Component | Parts by Weight | |
| Base Resin(III) | 48 | 48 |
| Byk 307 | 0.4 | 0.4 |
| Silwet L-7604 | 0.4 | 0.4 |
| Zeospheres G-200 | 30 | 30 |
| Nytal 300 | 16 | 16 |
| Silane A-187 | 1 | 1 |
| Byk 501 | 0.2 | 0.2 |
| PC-2506 (40%) | 2 | 1 |
| PC-2508 (40%) | 2 | 3 |
|  | Substrate | |
|  | AL 36 | AL 36 |
|  | E-Beam Cured | |
| Voltage (Kv) | 120 | 120 |
| Dose (Mrad) | 6 | 6 |
| Postbaked | no | no |
|  | Appearance | |
| Fish eye | None | None |
| Cure | Dry | Dry |

-continued

| | Formulation | |
|---|---|---|
| | 15A | 15B |
| Adhesion Test (ASTM D3359 Cross Hatch) | | |
| After 24 hrs. | Pass | Pass |
| 1T Bend Test (ASTM D 522-88) | | |
| After 24 hrs. | Pass | Pass |

EXAMPLE 16
E-Beam Cure and Thermal Cure Primer Formulations

Base resin (IV) having the following composition was prepared:

| Component | Parts by Weight |
|---|---|
| Araldite6084/4221 (20/80) | 45 |
| PC-1000 | 45 |
| PC-2003 | 10 |

Primer formulations containing Base Resin (IV) and the following other components were prepared and tested:

| | Formulations | | | | |
|---|---|---|---|---|---|
| Component | 16A(32-50A) | 16B(32-50C) | 16C(32-50A1) Parts by Weight | 16D(32-50B) | 16E(32-50D) |
| Base Resin(IV) | 48 | 50 | 48 | 48 | 48 |
| Byk 307 | 0.4 | 0.4 | 0.4 | 0.4 | 0.4 |
| Zeospheres G-200 with 187 0.5% | 46 | 46 | 46 | — | 46 |
| Zeospheres G-200 with 187 1.0% | — | — | — | 46 | — |
| Silane A-187 | 1 | 1 | 1 | 1 | 1 |
| Byk 501 | 0.2 | 0.2 | 0.2 | 0.2 | 0.2 |
| PC-2506 (40%) | 1 | 2 | 1 | 1 | 1 |
| PC-2508 (40%) | 3 | — | 3 | 3 | 1 |
| Aerosil R-972 | 0.5 | 0.5 | 1 | — | 0.5 |

| | Formulation | | | | |
|---|---|---|---|---|---|
| | 16A | | | 16B | |
| | | | Substrate | | |
| | AL 36 | Al 3000 | Galv. | AL 36 | Al 3000 | Galv. |
| | | | Thermally Cured | | |
| Hotplate 205 C. 1 min | No | No | No | Yes | Yes | Yes |
| | | | E-Beam Cured | | |
| Voltage (Kv) | 120 | 120 | 120 | N/A | N/A | N/A |
| Dose (Mrad) | 6 | 6 | 6 | N/A | N/A | N/A |
| Postbaked 125° C. 1 hour | yes | yes | yes | yes | yes | yes |
| | | | Appearance | | |
| Fish eye | None | None | None | None | None | None |
| Cure | Dry | Dry | Dry | Dry | Dry | Dry |
| | Adhesion Test (ASTM D3359 Cross Hatch) | | | | |
| After 24 hrs. | Pass | Pass | Pass | Pass | Pass | Pass |
| | 1T Bend Test (ASTM D 522-88) | | | | |
| After 24 hrs. | Pass | Pass | Pass | Pass | Pass | Pass |
| | Hammer Deform Test | | | | |
| After 24 hrs. | Pass | Pass | Pass | Pass | Pass | Pass |

-continued

| | Formulation | | | |
|---|---|---|---|---|
| | 16C | 16D | | 16E |
| | | Substrate | | |
| | Al 3000 | AL 36 | Al 3000 | Galv. | R-36-1 |

Thermally Cured

| | | | | | |
|---|---|---|---|---|---|
| Hotplate 205 C. 2 min | No | No | No | No | Yes |

E-Beam Cured

| | | | | | |
|---|---|---|---|---|---|
| Voltage (Kv) | 120 | 120 | 120 | 120 | N/A |
| Dose (Mrad) | 6 | 6 | 6 | 6 | N/A |
| Postbaked 125° C. 1 hour | Yes | yes | yes | yes | yes |

Appearance

| | | | | | |
|---|---|---|---|---|---|
| Fish eye | None | None | None | None | None |
| Cure | Dry | Dry | Dry | Dry | Dry |

Adhesion Test (ASTM D3359 Cross Hatch)

| | | | | | |
|---|---|---|---|---|---|
| After 24 hrs. | Pass | Pass | Pass | Pass | Pass |

1T Bend Test (ASTM D 522-88)

| | | | | | |
|---|---|---|---|---|---|
| After 24 hrs. | Pass | Pass | Pass | Pass | Pass |

EXAMPLE 17

E-Beam Cure (with and Without Postbake)

Primer Formulation

Primer formulations containing Base Resin (IV) from Example 16 and the following other components were prepared and tested:

| | Formulation | | |
|---|---|---|---|
| | 17A | 17B | 17C |
| Component | | Parts by Weight | |
| Base Resin (IV) | 48 | 48 | 48 |
| Byk 307 | 0.4 | 0.4 | 0.4 |
| Silwet L-7604 | 0.4 | 0.4 | 0.4 |
| Zeospheres G-400 | 46 | 46 | 46 |
| Silane A-187 | 1 | 1 | 1 |
| Byk 501 | 0.2 | 0.2 | 0.2 |
| PC-2506 (40%) | 2 | 1 | |
| PC-2508 (40%) | 2 | 3 | 4 |

| Formulation 17A |
|---|
| Substrate |

| | R36 1 | R36 1 | AL36 | AL36 | Clean | Clean | Chrome | Chrome | Non Chrome | Non Chrome |
|---|---|---|---|---|---|---|---|---|---|---|

E-Beam Cured

| | | | | | | | | | | |
|---|---|---|---|---|---|---|---|---|---|---|
| Voltage (Kv) | 120 | 120 | 120 | 120 | 120 | 120 | 120 | 120 | 120 | 120 |
| Dose (Mrad) | 6 | 6 | 6 | 6 | 6 | 6 | 6 | 6 | 6 | 6 |
| Postbaked 125° C. 15 min | No | Yes | No | Yes | No | Yes | No | Yes | No | Yes |

Appearance

| | | | | | | | | | | |
|---|---|---|---|---|---|---|---|---|---|---|
| Fish eye | None | None | None | None | None | None | None | None | None | None |
| Cure | Dry | Dry | Dry | Dry | Dry | Dry | Dry | Dry | Dry | Dry |

-continued

Adhesion Test (ASTM D3359 Cross Hatch)

| | | | | | | | | | |
|---|---|---|---|---|---|---|---|---|---|
| After 24 hrs | 4 | 1 | Pass | Pass | Pass Pass | Pass | Pass | Pass | Pass |

1T Bend Test (ASTM D 522-88)

| | | | | | | | | | |
|---|---|---|---|---|---|---|---|---|---|
| After 24 hrs | Pass | Pass | Pass | Pass | Pass | Pass | Pass | Pass | Pass | Pass |

| Formulation | | | | | | | | |
|---|---|---|---|---|---|---|---|---|
| | 17B | | | | | 17C | | |
| Substrate | | | | | | | | |
| R36 1 | R36 1 | AL 36 | AL 36 | R36 1 | R36 1 | AL 36 | AL 36 |

E-Beam Cured

| | | | | | | | | |
|---|---|---|---|---|---|---|---|---|
| Voltage (Kv) | 120 | 120 | 120 | 120 | 120 | 120 | 120 | 120 |
| Dose (Mrad) | 6 | 6 | 6 | 6 | 6 | 6 | 6 | 6 |
| Postbaked 125° C. 15 min | No | Yes | No | Yes | Yes | No | Yes | No |

Appearance

| | | | | | | | | |
|---|---|---|---|---|---|---|---|---|
| Fish eye | None | None | None | None | None | None | None | None |
| Cure | Very Very Slight Drag | Dry | Very Very Slight Drag | Dry | Dry | Very Slight Drag | Dry | Very Slight Drag |

Adhesion Test (ASTM D3359 Cross Hatch)

| | | | | | | | | |
|---|---|---|---|---|---|---|---|---|
| After 24 hrs | Pass | Pass | Pass | Pass | Pass | Pass | Pass | Pass |

OT Bend Test (ASTM D 522-88)

| | | | | | | | | |
|---|---|---|---|---|---|---|---|---|
| After 24 hrs | Pass | Pass | Pass | Pass | Pass | Pass | Pass | Pass |

EXAMPLE 18

E-Beam Cure (with and Without Postbake)

Primer Formulation

Base resin (V) having the following composition was prepared:

| Component | Parts by Weight |
|---|---|
| Araldite6084/4221 (20/80) | 40 |
| PC-1000 | 40 |
| PC-2003 | 20 |

Primer formulations containing Base Resin (V) and the following other components were prepared and tested:

| | Formulation | | |
|---|---|---|---|
| | 18A | 18B | 18C |
| Component | Parts by Weight | | |
| Base Resin (V) | 48 | 48 | 48 |
| Byk 307 | 0.4 | 0.4 | 0.4 |
| Silwet L-7604 | 0.4 | 0.4 | 0.4 |
| Zeospheres G-400 | 46 | 46 | 46 |
| Silane A-187 | 1 | 1 | 1 |
| Byk 501 | 0.2 | 0.2 | 0.2 |
| PC-2506 (40%) | 2 | 1 | — |
| PC-2508 (40%) | 2 | 3 | 4 |

| Formulation | | | | | | | |
|---|---|---|---|---|---|---|---|
| 18A | | | | 18B | | | |
| Substrate | | | | | | | |
| R36 1 | R36 1 | AL 36 | AL 36 | R36 1 | R36 1 | AL 36 | AL 36 |

-continued

E-Beam Cured

| | | | | | | | | |
|---|---|---|---|---|---|---|---|---|
| Voltage (Kv) | 120 | 120 | 120 | 120 | 120 | 120 | 120 | 120 |
| Dose (Mrad) | 6 | 6 | 6 | 6 | 6 | 6 | 6 | 6 |
| Postbaked 125° C. 15 min | No | Yes | No | Yes | No | Yes | No | Yes |

Appearance

| | | | | | | | | |
|---|---|---|---|---|---|---|---|---|
| Fish eye | None | None | None | None | None | None | None | None |
| Cure | Dry | Dry | Dry | Dry | Slightly Soft | Dry | Slightly Soft | Dry |

Adhesion Test (ASTM D3359 Cross Hatch)

| | | | | | | | | |
|---|---|---|---|---|---|---|---|---|
| After 96 hours | Pass | Pass | Pass | Pass | Pass | Pass | Pass | Pass |

1T Bend Test (ASTM D 522-88)

| | | | | | | | | |
|---|---|---|---|---|---|---|---|---|
| After 96 hours | Pass | Pass | Pass | Pass | Pass | Pass | Pass | Pass |

Formulation 18C

Substrate

| | R36 1 | R36 1 | AL 36 | AL 36 |
|---|---|---|---|---|

E-Beam Cured

| | | | | |
|---|---|---|---|---|
| Voltage (Kv) | 120 | 120 | 120 | 120 |
| Dose (Mrad) | 6 | 6 | 6 | 6 |
| Postbaked 125° C. 15 min | No | Yes | No | Yes |

Appearance

| | | | | |
|---|---|---|---|---|
| Fish eye | None | None | None | None |
| Cure | Slightly Soft | Dry | Slightly Soft | Dry |

Adhesion Test (ASTM D3359 Cross Hatch)

| | | | | |
|---|---|---|---|---|
| After 96 hours | Pass | Pass | Pass | Pass |

OT Bend Test (ASTM D 522-88)

| | | | | |
|---|---|---|---|---|
| After 96 hours | Pass | Pass | Pass | Pass |

EXAMPLE 19

E-Beam Cure and Thermal Cure

Primer Formulations

Base resin (VI) having the following composition was prepared:

| Component | Parts by Weight |
|---|---|
| Vikoflex 9010/ Araldite 6084 (80/20) | 45 |
| PC-1000 | 45 |
| PC-2003 | 10 |

Primer formulations containing Base Resin (VI) and the following other components were prepared and tested:

| Component | Formulations | | | | |
|---|---|---|---|---|---|
| | 19A | 19B | 19C | 19D | 19E |
| | Parts by Weight | | | | |
| Base Resin (VI) | 48 | 48 | 41.4 | 41 | 41 |
| Byk 307 | 0.4 | 0.4 | 0.4 | 0.4 | 0.4 |
| Zeospheres G-200 with 187 0.5% | 46.4 | 48.4 | 55 | 53 | 53 |
| Silane A-187 | 1 | 1 | 1 | 1 | 1 |
| Byk 501 | 0.2 | 0.2 | 0.2 | 0.2 | 0.2 |
| PC-2506 (40%) | — | 2 | 2 | — | 1 |
| PC-2508 (40%) | 4 | — | — | 4 | 1 |

| | Formulation | | | | | | | |
|---|---|---|---|---|---|---|---|---|
| | 19A | | | | 19B | | | |
| | Substrate | | | | | | | |
| | Al 3000 | Galvalume | Galv. | HDGT | Al 3000 | Galvalume | Galv. | HDGT |
| Thermally Cured | | | | | | | | |
| Hotplate 205 C. | No | No | No | No | 1 min | 1 min | 1 min | 1 min |
| E-Beam Cured | | | | | | | | |
| Voltage (Kv) | 120 | 120 | 120 | 120 | N/A | N/A | N/A | N/A |
| Dose (Mrad) | 6 | 6 | 6 | 6 | N/A | N/A | N/A | N/A |
| Postbaked 125° C. 1 hour | yes | yes | yes | yes | yes | yes | yes | yes |
| Appearance | | | | | | | | |
| Fish eye | None | None | None | None | None | None | None | None |
| Cure | Dry | Dry | Dry | Dry | Dry | Dry | Dry | Dry |
| Adhesion Test (ASTM D3359 Cross Hatch) | | | | | | | | |
| After 24 hrs. | Pass | Pass | Pass | Pass | Pass | Pass | Pass | Pass |
| 1T Bend Test (ASTM D 522-88) | | | | | | | | |
| After 24 hrs. | Pass | Pass | Pass | Pass | Pass | Pass | Pass | Pass |
| Hammer Deform Test | | | | | | | | |
| After 24 hrs | Pass | Pass | Pass | Pass | Pass | Pass | Pass | Pass |

| | Formulation | | | | | | | | |
|---|---|---|---|---|---|---|---|---|---|
| | 19C | | | | 19D | | | | 19E |
| | Substrate | | | | | | | | |
| | Alcoa | Galvalume | GALV | HDGT | Alcoa | Galvalume | GALV | HDGT | R-36-1 |
| Thermally Cured | | | | | | | | | |
| Hotplate 205 C. | 1 min | 1 min | 1 min | 1 min | No | No | No | No | 2 min. |
| E-Beam Cured | | | | | | | | | |
| Voltage (Kv) | N/A | N/A | N/A | N/A | 120 | 120 | 120 | 120 | N/A |
| Dose (Mrad) | N/A | N/A | N/A | N/A | 6 | 6 | 6 | 6 | N/A |
| Postbaked 125° C. 1 hour | yes | yes | yes | yes | yes | yes | yes | yes | yes |
| Appearance | | | | | | | | | |
| Fish eye | None | None | None | None | None | None | None | None | None |
| Cure | Dry | Dry | Dry | Dry | Dry | Dry | Dry | Dry | Dry |
| Adhesion Test (ASTM D3359 Cross Hatch) | | | | | | | | | |
| After 24 hrs. | Pass | Pass | Pass | Pass | Pass | Pass | Pass | Pass | Pass |
| 1T Bend Test (ASTM D 522-88) | | | | | | | | | |
| After 24 hrs. | Pass | Pass | Fail | Pass | Pass | Pass | Pass | Pass | Pass |

-continued

| | Hammer Deform Test | | | | | | | | |
|---|---|---|---|---|---|---|---|---|---|
| After 24 hrs | Pass | Pass | Pass | Pass | Pass | Pass | Pass | Pass | — |

Topcoat Formulations (Pigments)

Following are exemplary formulations for pigmented topcoat formulations curable by E-beam radiation or thermally (by adjusting the catalyst level). The formulations provide the desirable processing parameters and film properties described herein.

EXAMPLE 20

E-Beam Cure with and Without Postbake

Top Coat Formulation

Topcoat formulations containing Base Resin (IV) from Example 16 and the following other components were prepared and tested:

EXAMPLE 21

E-Beam Cure

Top Coat Formulations

Top Coat formulations containing Base Resin (IV) from Example 16 and the following other components were prepared and tested:

| | Formulation | |
|---|---|---|
| | 21A | 21B |
| Component | Parts by Weight | |
| Base Resin (IV) | 48 | 48 |
| Byk 307 | 0.4 | 0.4 |
| Zeospheres G-200 | 16.5 | 16.5 |

| | Formulation | | |
|---|---|---|---|
| | 20A | 20B | 20C |
| Component | Parts by Weight | | |
| Base Resin (IV) | 48 | 48 | 48 |
| Byk 307 | 0.4 | 0.4 | 0.4 |
| Silwet L-7604 | 0.4 | 0.4 | 0.4 |
| Zeospheres G-200 | 23 | 23 | 23 |
| $TiO_2$ | 23 | 23 | 23 |
| Silane A-187 | 1 | 1 | 1 |
| Byk 501 | 0.2 | 0.2 | 0.2 |
| PC-2506 (40%) | 2 | 1 | |
| PC-2508 (40%) | 2 | 3 | 4 |
| Viscosity | 2251 | 2251 | 2251 |

| | Formulation | | | | | |
|---|---|---|---|---|---|---|
| | 20A | 20A | 20B | 20B | 20C | 20C |
| Substrate | Al 3000 | Al 3000 | Al 3000 | Al 3000 | Al 3000 | Al 3000 |
| E-Beam Cured | | | | | | |
| Voltage (Kv) | 120 | 120 | 120 | 120 | 120 | 120 |
| Dose (Mrad) | 6 | 6 | 6 | 6 | 6 | 6 |
| Postbaked 125° C. 15 min | No | Yes | No | Yes | No | Yes |
| Appearance | | | | | | |
| Fish eye | None | None | None | None | None | None |
| Color | White | White | White | White | White | White |
| Cure | Dry | Dry | Very, Very, Slight Drag | Dry | Very, Slight Drag | Dry |
| Adhesion Test (ASTM D3359 Cross Hatch) | | | | | | |
| After 24 hrs. | Fail | Pass | Pass | Pass | Pass | Pass |
| 1T Bend Test (ASTM D 522-88) | | | | | | |
| After 24 hrs | Pass | Pass | Pass | Pass | Pass | Pass |

-continued

| | | |
|---|---|---|
| TiO₂ | 30 | 30 |
| Silane A-187 | 1 | 1 |
| Byk 501 | 0.1 | 0.1 |
| PC-2506 (40%) | 2 | 1 |
| PC-2508 (40%) | 2 | 3 |
| Viscosity | 1898 | 1710 |

| | Formulation | |
|---|---|---|
| | 21A | 21B |
| Substrate | | |
| | AL36 AL36 | AL 36 AL 36 |

E-Beam Cured

| | | | | |
|---|---|---|---|---|
| Voltage (Kv) | 120 | 120 | 120 | 120 |
| Dose (Mrad) | 6 | 6 | 6 | 6 |
| Postbaked 125° C. 15 min | no | yes | no | no |

Appearance

| | | | | |
|---|---|---|---|---|
| Fish eye | None | None | None | None |
| Color | White | White | White | White |
| Cure | Dry | Dry | Very Slight Drag | Dry |

Adhesion Test (ASTM D3359 Cross Hatch)

| | | | | |
|---|---|---|---|---|
| After 24 hrs. | Pass | Pass | Pass | Pass |

1T Bend Test (ASTM D 522-88)

| | | | | |
|---|---|---|---|---|
| After 24 hrs. | Pass | Pass | Pass | Pass |

Penny Rub Test

| | | | | |
|---|---|---|---|---|
| After 24 hrs | no mark | no mark | no mark | silight mark |

EXAMPLE 22

E-Beam Cure

Top Coat Formulations

Top Coat formulations containing Base Resin (IV) from Example 16 and the following other components were prepared and tested:

| | Formulation | | |
|---|---|---|---|
| | 22A | 22B | 22C |
| Component | Parts by Weight | | |
| Base Resin (IV) | 48.5 | 48.5 | 58 |
| Byk 307 | 0.4 | 0.4 | 0.4 |
| Zeospheres G-200 | 16 | 16 | — |
| TiO₂ 2160 | 30 | — | 36 |
| TiO₂ 2310 | — | 30 | — |
| Silane A-187 | 1 | 1 | 1 |
| Byk 501 | 0.1 | 0.1 | 0.1 |
| PC-2506 (40%) | 2 | 2 | 2.3 |
| PC-2508 (40%) | 2 | 2 | 2.3 |

| | Formulation | | | | | |
|---|---|---|---|---|---|---|
| | 22A | | 22B | | 22C | |
| Substrate | AL 36 | R-36-1 | AL 36 | R-36-1 | AL 36 | R-36-1 |

E-Beam Cured

| | | | | | | |
|---|---|---|---|---|---|---|
| Voltage (Kv) | 120 | 120 | 120 | 120 | 120 | 120 |
| Dose (Mrad) | 6 | 6 | 6 | 6 | 6 | 6 |
| Postbaked | yes | yes | yes | yes | yes | yes |
| 125° C. 1 hour | | | | | | |

Appearance

| | | | | | | |
|---|---|---|---|---|---|---|
| Fish eye | None | None | None | None | None | None |
| Color | White | White | White | White | White | White |
| Cure | — | — | Dry | Dry | — | — |

Adhesion Test (ASTM D3359 Cross Hatch)

| | | | | | | |
|---|---|---|---|---|---|---|
| After 24 hrs. | Pass | Pass | Pass | Pass | Pass | Pass |

1T Bend Test (ASTM D 522-88)

| | | | | | | |
|---|---|---|---|---|---|---|
| After 24 hrs. | Pass | Pass | Pass | Pass | Pass | Pass |

EXAMPLE 23

E-Beam Cure and Thermal Cure

Top Coat Formulations

Base resin (VII) having the following composition was prepared:

| Component | Parts by Weight |
|---|---|
| Araldite 6084/ 4221 (20/80) | 43 |
| PC-1000 | 42 |
| PC-2003 | 15 |

Top Coat formulations containing Base Resin (VII) and the following other components were prepared and tested:

| | Formulation | | | |
|---|---|---|---|---|
| | 23A | 23B | 23C | 23D |
| Component | Parts by Weight | | | |
| Base Resin (VII) | 58 | 58 | 58 | 60 |
| Byk 307 | 0.4 | 0.4 | 0.4 | 0.4 |
| TiO₂ 2160 | 36 | — | — | — |
| TiO₂ 2310 | — | 36 | — | 36 |
| TiO₂ 2020 | — | — | 36 | — |
| Silane A-187 | 1 | 1 | 1 | 1 |
| Byk 501 | 0.1 | 0.1 | 0.1 | 0.1 |
| PC-2506 (40%) | 2.3 | 2.3 | 2.3 | 2 |
| PC-2508 (40%) | 2.3 | 2.3 | 2.3 | — |

| | Formulation | | | | | |
|---|---|---|---|---|---|---|
| | 23A | | 23B | | 23C | |
| Substrate | AL 36 | R 36 1 | AL 36 | R 36 1 | AL 36 | R 36 1 |

E-Beam Cured

| | | | | | | |
|---|---|---|---|---|---|---|
| Voltage (Kv) | 120 | 120 | 120 | 120 | 120 | 120 |
| Dose (Mrad) | 6 | 6 | 6 | 6 | 6 | 6 |
| Postbaked 125° C. 1 hour | yes | yes | yes | yes | yes | yes |

Appearance

| | | | | | | |
|---|---|---|---|---|---|---|
| Fish eye | None | None | None | None | None | None |
| Color | White | White | White | White | White | White |
| Cure | — | — | Dry | Dry | Dry | Dry |

Adhesion Test (ASTM D3359 Cross Hatch)

| | | | | | | |
|---|---|---|---|---|---|---|
| After 24 hrs. | Pass | Pass | Pass | Pass | Pass | Pass |

-continued

1T Bend Test (ASTM D 522-88)

| After 24 hrs. | Pass | Pass | Pass | Pass | Pass | Pass |
|---|---|---|---|---|---|---|

Thermally Cured

Formulation 23D

| Substrate | AL 36 | Al 3000 | Galv. | Galvalume |
|---|---|---|---|---|
| Thermally Cured Hotplate 205° C. 1 minute | | | | |
| Postbaked 125° C. 1 hour | yes | yes | yes | yes |
| Appearance | | | | |
| Fish eye | None | None | None | None |
| Color | White | White | White | White |
| Cure | Dry | Dry | Dry | Dry |
| Adhesion Test (ASTM D3359 Cross Hatch) | | | | |
| After 24 hrs. | Pass | Pass | Pass | Pass |
| 1T Bend Test (ASTM D 522-88) | | | | |
| After 24 hrs. | Pass | Pass | Fail | Fail |
| Hammer Deform Test | | | | |
| After 24 hrs. | Pass | Pass | Fail | Fail |

EXAMPLE 24

E-Beam Cure

Top Coat Formulations

Base resin (VIII) having the following composition was prepared:

| Component | Parts by Weight |
|---|---|
| Vikoflex 9010/Araldite6084 (80/20) | 43 |
| PC-1000 | 42 |
| PC-2003 | 15 |

Top coat formulations containing Base Resin (VIII) and the following other components were prepared:

| | Formulation | |
|---|---|---|
| | 24A | 24B |
| Component | Parts by Weight | |
| Base Resin (VIII) | 45.4 | 45.4 |
| Byk 307 | 0.4 | 0.4 |
| TiO$_2$ 2310 | 50 | 48 |
| Silane A-187 | 1 | 1 |
| Byk 501 | 0.2 | 0.2 |
| PC-2506 (40%) | 2 | 2 |
| PC-2508 (40%) | — | 2 |

| | Formulation 24A Substrate | | | |
|---|---|---|---|---|
| | Al 3000 | Galvalume | Galv. | HDGT |
| Thermally Cured Hotplate 205° C. 1 minute | | | | |
| Postbaked 125° C. 1 hour | Yes | yes | yes | yes |
| Appearance | | | | |
| Cure | Dry | Dry | Dry | Dry |
| Adhesion Test (ASTM D3359 Cross Hatch) | | | | |
| After 24 hrs. | Pass | Pass | Pass | Pass |
| 1T Bend Test (ASTM D 522-88) | | | | |
| After 24 hrs. | Pass | Pass | Pass | Fail |

EXAMPLE 25

E-Beam Cure

Top Coat Formulations

Base resin (IX) having the following composition was prepared:

| Component | Parts by Weight |
|---|---|
| Vikoflex 9010/Araldite6097 (80/20) | 25 |
| 4221 | 20 |
| PC-1000 | 40 |
| PC-2003 | 15 |

| | Formulation | | |
|---|---|---|---|
| | 25A | 25B | 25C |
| Component | Parts by Weight | | |
| Base Resin (IX) | 50 | 50 | 50 |
| Byk 307 | 0.4 | 0.4 | 0.4 |
| TiO$_2$ 2310 | 46.4 | 44.4 | 44 |
| Benzophenol | — | — | 0.5 |
| Silane A-187 | 1 | 1 | 1 |
| Byk 501 | 0.2 | 0.2 | 0.2 |
| PC-2506 (40%) | 2 | 2 | 2 |
| PC-2508 (40%) | — | 2 | 2 |

EXAMPLE 26

Thermal and E-Beam Cure

Top Coat Formulation

Base resin (X) having the following composition was prepared:

| Component | Parts by Weight |
|---|---|
| 4221 | 30 |
| PC-1000 | 30 |

-continued

| Component | Parts by Weight |
|---|---|
| PC-2003 | 30 |
| Capa316/4101 | 10 |

Coating formulations containing Base Resin (X) and the following other components were prepared and tested:

| | Formulation | | | |
|---|---|---|---|---|
| | 26A | 26B | 26C | 26D |
| Component | Parts by Weight | | | |
| Base (IX) | 50 | 50 | 56 | 56 |
| Byk 307 | 0.6 | 0.6 | 0.6 | 0.6 |
| Silwet L-7604 | 0.4 | 0.4 | 0.4 | 0.4 |
| Nytal 300 | 15 | 15 | — | — |
| $TiO_2$ | 30 | 30 | 40 | 40 |
| Silane A-187 | 1 | 1 | 1 | 1 |
| Byk 501 | 0.2 | 0.2 | 0.2 | 0.2 |
| PC-2506 (40%) | — | 2 | 2.2 | — |
| PC-2508 (40%) | 4 | — | — | 4.4 |
| Substrate | | | | |
| | AL-36 | AL-36 | AL-36 | AL-36 |
| Thermally Cured | | | | |
| Hotplate 177° C. 2 min | No | Yes | Yes | No |
| E-Beam Cured | | | | |
| Voltage (Kv) | 120 | N/A | N/A | 120 |
| Dose (Mrad) | 6 | N/A | N/A | 6 |
| Postbaked 125° C. 15 min | No | No | No | No |

| | Formulation | | | |
|---|---|---|---|---|
| | 26A | 26B | 26C | 26D |
| Appearance | | | | |
| Fish Eye | None | None | None | None |
| Color | White | White | White | White |
| Cure | Dry | Dry | Dry | Dry |
| Adhesion Test (ASTM D3359 Cross Hatch) | | | | |
| After 24 hrs. | Pass | Pass | Pass | Pass |
| After 72 hrs | Pass | Pass | | |
| 1T Bend Test (ASTM D 522-88) | | | | |
| After 24 hrs. | Pass | Pass | Pass | Pass |
| After 72 hrs. | Pass | Pass | — | — |

EXAMPLE 27

E-Beam Cure with and Without Postbake

Top Coat Formulation

Base resin (XI) having the following composition was prepared:

| Component | Parts by Weight |
|---|---|
| Araldite 6084/4221 (20/80) | 40 |
| PC-1000 | 40 |
| PC-2003 | 20 |

Top Coat formulations containing Base Resin (XI) and the following other components were prepared and tested:

| | Formulation | |
|---|---|---|
| | 27A | 27B |
| Base Resin (X) | 53 | 53 |
| Byk 307 | 0.4 | 0.4 |
| L-7604 | 0.4 | 0.4 |
| Nytal 300 | 20 | 20 |
| $TiO_2$ | 20 | 20 |
| Silane A-187 | 1 | 1 |
| Byk 501 | 0.2 | 0.2 |
| PC-2506 (40%) | 1.5 | 1 |
| PC-2508 (40%) | 3.5 | 4 |

| | Formulation | | | | |
|---|---|---|---|---|---|
| | 27A | | | 27B | |
| Substrate | Al 3000 | Al 3000 | Al 3000 | Al 3000 | Al 3000 |
| E-Beam Cured | | | | | |
| Voltage (kv) | 120 | 120 | 120 | 120 | 120 |
| Dose (Mrad) | 6 | 6 | 12 | 6 | 6 |
| Postbaked 125° C. 15 min | No | Yes | No | No | Yes |
| Appearance | | | | | |
| Fish eye | None | None | None | None | None |
| Color | White | White | White | White | White |

-continued

| | | | | | |
|---|---|---|---|---|---|
| Cure | Very, Very, Slight Drag | Dry | Dry | Very, Very, Slight Drag | Dry |
| Adhesion Test(ASTM D3359 Cross Hatch) | | | | | |
| After 48 hrs. | Pass | Pass | Pass | Pass | Pass |
| After 72 hrs | — | Pass | Pass | Pass | Pass |
| 1T Bend Test(ASTM D 522-88) | | | | | |
| After 48 hrs. | Pass | Pass | Pass | Pass | Pass |
| After 72 hrs. | — | Pass | Pass | Pass | Pass |

EXAMPLE 28

Thermal Cure with Postbake

Top Coat Formulation

Base resin (XII) having the following composition was prepared:

| Component | Parts by Weight |
|---|---|
| Vikoflex 9010/Araldite 6084 (80/20) | 40 |
| PC-1000 | 40 |
| PC-2003 | 20 |

Top Coat formulations containing Base Resin (XII) and the following other components were prepared and tested:

| Formulation 28 | |
|---|---|
| Base Resin (XII) | 45.4 |
| Byk 307 | 0.4 |
| TiO$_2$ | 50 |
| Silane A-187 | 1 |
| Byk 501 | 0.2 |
| PC-2506 (40%) | 3 |
| PC-2508 (40%) | — |

| Substrate | | | |
|---|---|---|---|
| Al 3000 | Galvalume | Galv. | HDGT |
| Thermally Cured- 205° C. for 1 min. | | | |
| Postbaked 125° C. 1 hour | Yes | Yes | Yes | Yes |
| Appearance | | | |
| Cure | Dry | Dry | Dry | Dry |
| Adhesion Test(ASTM D3359 Cross Hatch) | | | |
| After 24 hrs. | Pass | Pass | Pass | Pass |
| 1T Bend Test(ASTM D 522-88) | | | |
| After 24 hrs. | Pass | Micro-Crack | Micro-Crack | Micro-Crack |

Weathering/Enviornmental Testing

The following Examples provide the results of weathering/environmental testing of primers and/or topcoat formulations from many of the examples provided herein:

EXAMPLE 29

ASTM Test B117-Salt Fog Weathering Test

After being painted with a primer formulation and/or a top coat formulation from the above Examples, all substrates (panels) were cured by Electron Beam at 120 Kv with a dose of 6 Mrad followed by a postbake at 125° C. for 1 hour in a convention oven. The salt solution used was 5% by weight sodium chloride in deionized water. The duration of the test was 1000 hours. The substrates used in Table I were either AL 36 aluminum panels (Q Panel AL 36-chromate pretreatment) or R36 1 steel panels (Q Panel R36 1 Bondrite 1000, Iron phosphate, P60 chrome, and DI water rinse).

ASTM test D 1654 was performed to determine the amount of creep of corrosion from a scribed line through a coating on the panel. The term "min" indicates the measurement in mils (1 mil=25 $\mu$m) of the area of the scribe with the least creep; "max" is the measurement in mils of the area of the scribe with the most creep; and "Mean" is the average of all measured areas in mils.

ASTM test D 714 was performed to determine the amount and type, if any, of coating blistering. A rating of 1 indicates the largest blisters, and 8 is the smallest in size. Distribution (distrib.) is the frequency of blisters on the panel.

ASTM test D 610 was performed to determine the amount and type, if any, of surface rust on the panels. A frequency (freq.) of 0 means that >50% of the surface is rusted, and 10 indicates that <0.01% of surface is rusted. "Type" is the description of the type of surface rust found on the panels: "S" is spot; "P" is pinpoint; and "H" is hybrid.

ASTM test D 3359 was performed to determine the adhesion of the coating to the substrate by tape pull.

TABLE I

ASTM Test B117-Salt Fog Weathering Test

Observations-1000 hours

| Primer Ex. # | Substrate- AL 36 Thickness (mil) | Top coat Ex. # | Thickness (mil) | Creep of Corrosion D 1654 min. (mil) | max. (mil) | Mean | Blistering D 714 rating | distrib. | Surface Rust D 610 freq. | type | Adhesion D 3359 |
|---|---|---|---|---|---|---|---|---|---|---|---|
| 11B | 0.6 | — | — | 0 | 0 | 0 | none | — | 10 | | pass |
| 13B | 0.4 | — | — | 0 | 0 | 0 | none | — | 10 | | pass |
| — | — | 21A | 0.6 | 0 | 0 | 0 | none | — | 10 | | pass |
| — | — | 21A | 0.6 | 0 | 0 | 0 | none | — | 10 | | pass |
| 13B | 0.4 | 21A | 1 | 0 | 0 | 0 | none | — | 10 | | pass |
| Substrate R36 | | | | | | | | | | | |
| 11B | 1 | — | — | 0.3 | 1.75 | 1 | 8 | spotty medium dense | 6 | H | pass |
| — | — | 21A | 1 | 0 | 1.1 | 0.6 | 2 | spotty medium dense | 7 | S | fail |
| — | — | 21A | 1.8 | 0 | 1.5 | 0.8 | none | | 7 | S | small fail |
| — | — | 21A | 1.8 | 0 | 2 | 0.7 | 8 | spotty few | 7 | S | small fail |
| — | — | 21A | 1.2 | 0 | 1.55 | 0.75 | 8 | spotty medium | 7 | S | large fail |
| — | — | 21A | 1.2 | 0 | 1.55 | 0.85 | 8 | spotty medium | 7 | S | large fail |
| — | — | 21A | 1.2 | 0 | 1.65 | 1 | 8 | spotty medium | 7 | S | large fail |

EXAMPLE 30

ASTM Test D 4587-Fluorescent UV-Condensation Exposure

After being painted with a primer formulation and/or a top coat formulation from the Examples provided above, all substrates (panels) were cured by Electron Beam at 120 Kv with a dose of 6 Mrad followed by a postbake at 125° C. PMT for 1 hour in a convection oven. The duration of the test was 1000 hours, and each cycle alternated between exposure to 8 hours of UV light at 60° C. (using UVA lamps set to 0.68 W(m² nm) and exposure to 4 hours of condensation at 50° C.

TABLE II

ASTM Test D 4587-Fluorescent UV-Condensation Exposure

| Primer Ex. # | Top C at Ex. # | Observations 1000 hrs. Adhesion D 3359 |
|---|---|---|
| Substrate AL 36 | | |
| 11B | 21A | Pass |
| — | 21A | Pass |
| 11B | 23A | Pass |
| — | 23A | Pass |
| 11B | 23C | Pass |
| — | 23C | Pass |
| — | 22A | Pass |
| 11B | 22C | Pass |
| — | 22C | Pass |
| Substrate Galvalume Pretreatment-Bondrite 1310 | | |
| 11C | 21A | Pass |
| — | 21B | Pass |
| 11C | 23A | Pass |
| — | 23A | Pass |

TABLE II-continued

ASTM Test D 4587-Fluorescent UV-Condensation Exposure

| Primer Ex. # | Top C at Ex. # | Observations 1000 hrs. Adhesion D 3359 |
|---|---|---|
| 11B | 23C | Pass |
| — | 23C | Pass |
| Substrate Galvanized Pretreatment-Bondrite 1303 | | |
| 11C | 21A | Pass |
| — | 21B | minor edge |
| — | 23A | Pass |
| 11B | 23C | Pass |
| 11C | 23A | Pass |
| — | 23C | Pass |

All panels had a very slight drop in gloss and a very, very slight yellowing when comparing exposed areas to non-exposed areas.

EXAMPLE 31

ASTM Test D 5894-Cyclic Salt Fog/UV Exposure of Painted Metal

Prior to painting, all aluminum-based panels were cured for 50 sec. at 205° C. PMT in a convection oven; and the steel based panels, 90 sec. at 205° C. PMT. After a primer formulation and/or a top coat formulation from the Examples provided above was applied, all substrates (panels) were cured thermally or by Electron Beam at 120 Kv with a dose of 6 Mrad followed by a postbake at 125° C. PMT for 1 hour in a convection oven. The thickness of the primer coats ranged from 0.3 to 0.5 mil, and the thickness of the topcoats ranged from 0.5 to 0.7 mil. One coat systems ranged in thickness from 0.7 to 1.0 mil.

TABLE III

| Sample No. | Panel Type | Primer Ex. No. | Thickness (mil) | Topcoat Ex. No. | Thickness (mil) | Total Thickness |
|---|---|---|---|---|---|---|
| | | | Samples-Thermal Cure | | | |
| 101 | Al 3000 | 16B | 0.3 | 23D | 0.9 | 1.2 |
| 102 | Al 3000 | 16B | 0.3 | 23D | 1 | 1.3 |
| 103 | AL-36 | 16B | 0.3 | 24A | 0.8 | 1.1 |
| 104 | Treated Galv. | 16B | 0.3 | 24A | 0.6 | 0.9 |
| 105 | Galvalume | 16B | 0.3 | 24A | 0.5 | 0.8 |
| 106 | Galvalume | 16B | 0.3 | 24A | 0.5 | 0.8 |
| 107 | Al 3000 | 19A | 0.3 | 23D | 1 | 1.3 |
| 108 | Al 3000 | 19A | 0.3 | 23D | 1 | 1.3 |
| 109 | Al 3000 | 19A | 0.3 | 24A | 0.8 | 1.1 |
| 110 | Al 3000 | 19A | 0.3 | 24A | 0.8 | 1.1 |
| 111 | AL-36 | 19A | 0.3 | 24A | 0.8 | 1.1 |
| 112 | AL-36 | 19A | 0.3 | 24A | 0.8 | 1.1 |
| 113 | Treated Galv. | 19A | 0.3 | 24A | 0.7 | 1 |
| 114 | Treated Galv. | 19A | 0.3 | 24A | 0.6 | 0.9 |
| 115 | Galvalume | 19A | 0.3 | 24A | 0.8 | 1.1 |
| 116 | Al 3000 | 19A | 0.3 | 25A | 1 | 1.3 |
| 117 | Al 3000 | 19A | 0.3 | 25A | 1 | 1.3 |
| 118 | AL-36 | 19A | 0.3 | 25A | 0.8 | 1.1 |
| 119 | AL-36 | 19A | 0.3 | 25A | 0.8 | 1.1 |
| 120 | Treated Galv. | 19A | 0.3 | 25A | 0.5 | 0.8 |
| 121 | Treated Galv. | 19A | 0.3 | 25A | 0.3 | 0.6 |
| 122 | Galvalume | 19A | 0.3 | 25A | 0.7 | 1 |
| 123 | Galvalume | 19A | 0.3 | 25A | 0.8 | 1.1 |
| 124 | Al 3000 | — | — | 24A | 1.1 | 1.1 |
| 125 | Al 3000 | — | — | 24A | 1.1 | 1.1 |
| 126 | AL-36 | — | — | 24A | 0.9 | 0.9 |
| 127 | AL-36 | — | — | 24A | 0.9 | 0.9 |
| 128 | Treated Galv. | — | — | 24A | 0.7 | 0.7 |
| 129 | Treated Galv. | — | — | 24A | 0.7 | 0.7 |
| 130 | Galvalume | — | — | 24A | 0.7 | 0.7 |
| 131 | Galvalume | — | — | 24A | 0.7 | 0.7 |
| 132 | Al 3000 | — | — | 25A | 1 | 1 |
| 133 | Al 3000 | — | — | 25A | 1.1 | 1.1 |
| 134 | AL-36 | — | — | 25A | 1 | 1 |
| 135 | AL-36 | — | — | 25A | 1 | 1 |
| 136 | Treated Galv. | — | — | 25A | 0.8 | 0.8 |
| 137 | Treated Galv. | — | — | 25A | 0.8 | 0.8 |
| 138 | Galvalume | — | — | 25A | 0.9 | 0.9 |
| 139 | Galvalume | — | — | 25A | 1 | 1 |
| | | | Samples-E-Beam Cure | | | |
| 140 | Al 3000 | 16A | 0.3 | 24B | 1 | 1.3 |
| 141 | Al 3000 | 16A | 0.3 | 24B | 1.1 | 1.4 |
| 142 | AL-36 | 16A | 0.3 | 23B | 1 | 1.3 |
| 143 | AL-36 | 16A | 0.3 | 23B | 1 | 1.3 |
| 144 | Treated Galv. | 16A | 0.3 | 24B | 0.6 | 0.9 |
| 145 | Galvalume | 16A | 0.3 | 24B | 0.5 | 0.8 |
| 146 | Galvalume | 16A | 0.3 | 24B | 0.8 | 1.1 |
| 147 | Al 3000 | 19B | 0.3 | 24B | 1 | 1.3 |
| 148 | Al 3000 | 19B | 0.3 | 24B | 1 | 1.3 |
| 149 | AL-36 | 19B | 0.3 | 24B | 0.8 | 1.1 |
| 150 | AL-36 | 19B | 0.3 | 24B | 0.8 | 1.1 |
| 151 | Treated Galv. | 19B | 0.3 | 24B | 0.6 | 0.9 |
| 152 | Galvalume | 19B | 0.3 | 24B | 0.6 | 0.9 |
| 153 | Galvalume | 19B | 0.3 | 24B | 0.7 | 1 |
| 154 | AL-36 | 19B | 0.3 | 23B | 0.9 | 1.2 |
| 155 | AL-36 | 19B | 0.3 | 23B | 0.9 | 1.2 |
| 156 | AL-36 | 19B | 0.3 | 25B | 0.8 | 1.1 |
| 157 | AL-36 | 19B | 0.3 | 25B | 0.8 | 1.1 |
| 158 | Treated Galv. | 19B | 0.3 | 25B | 0.8 | 1.1 |
| 159 | Treated Galv. | 19B | 0.3 | 25B | 0.7 | 1 |

TABLE III-continued

| Sample No. | Panel Type | Primer Ex. No. | Thickness (mil) | Topcoat Ex. No. | Thickness (mil) | Total Thickness |
|---|---|---|---|---|---|---|
| 160 | Galvalume | 19B | 0.3 | 25B | 0.6 | 0.9 |
| 161 | Galvalume | 19B | 0.3 | 25B | 0.6 | 0.9 |
| 162 | Treated Galv. | 19B | 0.3 | 25C | 0.7 | 1 |
| 163 | Treated Galv. | 19B | 0.3 | 25C | 0.7 | 1 |
| 164 | Galvalume | 19B | 0.3 | 25C | 0.6 | 0.9 |
| 165 | Al 3000 | — | — | 25C | 1.2 | 1.2 |
| 166 | Al 3000 | — | — | 25C | 1.2 | 1.2 |
| 167 | AL-36 | — | — | 25C | 1 | 1 |
| 168 | AL-36 | — | — | 25C | 1 | 1 |
| 169 | Al 3000 | — | — | 24B | 1 | 1 |
| 170 | Al 3000 | — | — | 24B | 1 | 1 |
| 171 | AL-36 | — | — | 24B | 1 | 1 |
| 172 | AL-36 | — | — | 24B | 0.9 | 0.9 |
| 173 | Al 3000 | — | — | 25B | 1.1 | 1.1 |
| 174 | Al 3000 | — | — | 25B | 1.2 | 1.2 |
| 175 | AL-36 | — | — | 25B | 1 | 1 |
| 176 | AL-36 | — | — | 25B | 1 | 1 |
| 177 | Treated Galv. | — | — | 25B | 1.2 | 1.2 |
| 178 | Galvalume | — | — | 25B | 0.8 | 0.8 |
| 179 | Galvalume | — | — | 25B | 0.8 | 0.8 |

TESTING

The duration of the ASTM test D 5894 test was 1000 hours, and each UV/condensation cycle alternated between exposure to 4 hours of UV light at 60° C. (using UVA lamps set to 0.72 W($m^2$ nm)) and exposure to 4 hours of condensation at 50° C. using a UV/Condensation cabinet from Q-Panel Test Equipment as Model No. QUV/se. Each fog/dry cycle alternated between exposure to 1 hour fog at ambient temperature and exposure to 1 hour dry at 35° C. The fog solution used was 0.05% by weight sodium chloride and 0.35% by weight ammonium sulfate in deionized water, and the Fog/Dry cabinet was Q-Panel Test Equipment Model No. Q-Fog-CCT600. Each panel was kept in each cabinet for a duration of 168 hours before being transferred to the other cabinet. Gloss was measured on a Gardco Novo-Gloss Statistical Glossmeter. Chalk was tested by ASTM D-424 standards. The results of the test are found in Table IV:

TABLE IV

| | Pre-Test Gloss GU | | Post-Test Gloss GU | | Observations-1000 hours | | | |
|---|---|---|---|---|---|---|---|---|
| | | | | | Cross Creep | Blistering | Chalk | Adhesion |
| Sample No. | 20° | 60° | 20° | 60° | D 1654 | D 714 | D 424 | D 3359 |
| 101 | 63.1 | 83.8 | — | — | 0 | 10 | none | — |
| 102 | 63.9 | 84.2 | — | — | 0 | 10 | none | Pass |
| 103 | 10.8 | 55.8 | 13.4 | — | 0 | 10 | none | — |
| 104 | 9 | 51.7 | — | — | 0 | 10 | none | — |
| 105 | 5.7 | 44.4 | — | — | 0 | 10 | none | — |
| 106 | 3.6 | 38.5 | — | — | 0 | 10 | none | Pass |
| 107 | 60.3 | 93.5 | — | — | 0 | 10 | none | — |
| 108 | 59.3 | 82.8 | 59.3 | — | 0 | 10 | none | Pass |
| 109 | 4.5 | 40 | — | — | 0 | 10 | none | — |
| 110 | 4.6 | 34.5 | — | — | 0 | 10 | none | Pass |
| 111 | 5.2 | 42.2 | — | — | 0 | 10 | none | — |
| 112 | 4.7 | 42 | — | — | 0 | 10 | none | Pass |
| 113 | 10.2 | 53.1 | — | — | 0 | 10 | none | — |
| 114 | 7.2 | 46.8 | — | — | 0 | 10 | none | Pass |
| 115 | 9.3 | 56.2 | — | — | 0 | 10 | none | — |
| 116 | 6.7 | 42.1 | — | — | 0 | 10 | none | — |
| 117 | 7.6 | 46.2 | — | — | 0 | 10 | none | Pass |
| 118 | 7.8 | 48 | — | — | 0 | 10 | none | — |
| 119 | 9.2 | 50.6 | — | — | 0 | 10 | none | Pass |
| 120 | 8 | 49 | — | — | 1/16 | 10 | none | — |
| 121 | 5.2 | 29.4 | — | — | edge | 10 | none | Pass |
| 122 | 4 | 38 | — | — | 0 | 10 | none | — |
| 123 | 8.3 | 51.9 | — | — | 0 | 10 | none | Pass |
| 124 | 13.2 | 55.6 | — | — | 0 | 10 | none | — |
| 125 | 7.4 | 47.6 | — | — | 0 | 10 | none | Pass |
| 126 | 13.8 | 57.6 | — | — | 0 | 10 | none | — |
| 127 | 10.1 | 53.4 | — | — | 0 | 10 | none | Pass |
| 128 | 4.6 | 41.2 | — | — | 1/16 | 9 | none | — |

TABLE IV-continued

| | | | | | Observations-1000 hours | | | |
|---|---|---|---|---|---|---|---|---|
| | Pre-Test Gloss GU | | Post-Test Gloss GU | | Cross Creep | Blistering | Chalk | Adhesion |
| Sample No. | 20° | 60° | 20° | 60° | D 1654 | D 714 | D 424 | D 3359 |
| 129 | 3.6 | 36.5 | — | — | 1/16 | 9 | none | Pass |
| 130 | 5.6 | 45 | — | — | edge | 10 | none | — |
| 131 | 4.2 | 41.9 | — | — | 0 | 10 | none | Pass |
| 132 | 7.1 | 45 | — | — | 0 | 10 | none | — |
| 133 | 9 | 48.3 | — | — | 0 | 10 | none | Pass |
| 134 | 7.2 | 46 | — | — | 0 | 10 | none | — |
| 135 | 9.2 | 50.2 | — | — | 0 | 10 | none | Pass |
| 136 | 9.8 | 44.1 | — | — | 0 | 10 | none | — |
| 137 | 12.6 | 56.3 | — | — | 0 | 10 | none | Pass |
| 138 | 10.8 | 53.8 | — | — | 0 | 10 | none | — |
| 139 | 9 | 51.4 | — | — | 0 | 10 | none | Pass |
| 140 | 31.8 | 71 | 43.3 | 67.5 | 0 | 10 | none | — |
| 141 | 14.6 | 58.8 | 19.3 | 50.3 | 0 | 10 | none | Pass |
| 142 | 75 | 88.7 | 58.6 | 80.5 | 0 | 10 | none | — |
| 143 | 74.1 | 88.8 | 70.8 | 85.9 | 0 | 10 | none | Pass |
| 144 | 10.8 | 54.3 | 13.1 | 57.3 | 1/8 | 10 | none | — |
| 145 | 12.5 | 58.6 | 17 | 63.6 | edge | 10 | none | — |
| 146 | 10.9 | 56.8 | 14.9 | 58.8 | edge | 10 | none | Pass |
| 147 | 16.6 | 60.6 | 23 | 68.1 | 0 | 10 | none | — |
| 148 | 10.3 | 53.7 | 15.2 | 57.3 | 0 | 10 | none | Pass |
| 149 | 10.4 | 52.7 | 18.4 | 61 | 0 | 10 | none | — |
| 150 | 10.5 | 53.5 | 13.2 | 52.8 | 0 | 10 | none | Pass |
| 151 | 14.4 | 60.3 | 22.2 | 64.6 | 1/16 | 10 | none | — |
| 152 | 18.8 | 65.8 | 19.7 | 64.3 | edge | 10 | none | — |
| 153 | 14.7 | 60.8 | 13.9 | 63.5 | edge | 10 | none | Pass |
| 154 | 70.5 | 87.7 | 47.7 | 78.3 | 0 | 10 | none | — |
| 155 | 73.4 | 88.5 | 50.2 | 77.6 | 0 | 10 | none | Pass |
| 156 | 51.2 | 80.6 | 57.2 | 83.2 | 0 | 10 | none | — |
| 157 | 47.7 | 78.5 | 41.9 | 72.6 | 0 | 10 | none | Pass |
| 158 | 41.2 | 75.5 | 29.7 | 73.9 | 1/16 | 10 | none | — |
| 159 | 45.7 | 77.9 | 55.8 | 84.2 | 1/16 | 10 | none | Pass |
| 160 | 40.1 | 77.4 | 40 | 73.4 | edge | 10 | none | — |
| 161 | 33.9 | 74.6 | — | — | — | — | — | — |
| 162 | 46.4 | 77.5 | 48.9 | 77.5 | 1/32 | 10 | none | — |
| 163 | 45.3 | 80.1 | 41.2 | 72.8 | 1/16 | 10 | none | Pass |
| 164 | 40.1 | 78.3 | 31.4 | 74 | edge | 10 | none | — |
| 165 | 57.9 | 82.3 | 43.2 | 76.5 | 0 | 10 | none | — |
| 166 | 61.4 | 83.4 | 49.5 | 76 | 0 | 10 | none | Pass |
| 167 | 57.7 | 80.7 | 49.9 | 74.6 | 0 | 10 | none | — |
| 168 | 61.4 | 83.1 | 57.6 | 79.6 | 0 | 10 | none | Pass |
| 169 | 25.4 | 68.4 | 40.7 | 75 | 0 | 10 | none | — |
| 170 | 20.2 | 62.5 | 31.2 | 64.8 | 0 | 10 | none | Pass |
| 171 | 30.2 | 68 | 38.2 | 58.9 | 0 | 10 | none | — |
| 172 | 28.8 | 69.8 | 34.4 | 69.6 | 0 | 10 | none | Pass |
| 173 | 53.2 | 79.5 | 49.4 | 78.7 | 0 | 10 | none | — |
| 174 | 64.3 | 85.3 | 48.9 | 71.4 | 0 | 10 | none | Pass |
| 175 | 58.9 | 82.1 | 44.1 | 77.8 | 0 | 10 | none | — |
| 176 | 56.8 | 81.7 | 54.5 | 75.3 | 0 | 10 | none | Pass |
| 177 | 54.4 | 81.4 | 51.5 | 78.6 | 1/32 | 10 | none | — |
| 178 | 30.1 | 78.2 | 27.1 | 75.6 | 0 | 10 | none | — |
| 179 | 30 | 78.2 | 32.7 | 77.4 | 0 | 10 | none | Pass |

Surprisingly, as indicated in Table IV, both one coat and two coat systems (E-beam and thermal) passed all criteria of testing with minimum, if any, deterioration of the coatings in terms of loss of adhesion and gloss, yellowing, chalking, blistering, and rusting. In fact, no yellowing, chalking, blistering or rusting of the metal was observed.

The unique and specific combination of the specific ingredients in the exact amounts and proportions allow the formulations of the present invention to exhibit the excellent film properties shown in the above examples. The mere combination of these ingredients or similar ingredients does not guarantee a coating having satisfactory film properties. The specific cycloaliphatic epoxy functional siloxanes in the exact proportions described herein must be used. The same is true for the non-silicon-containing epoxy resins, flexibilizers, diluents, adhesion promoters, and iodonium catalysts, as well as for the fillers, pigments, diluents, tougheners, flow control agents, and antifoaming agents.

The invention has been described in detail with particular reference to preferred embodiments thereof, but it will be understood by those skilled in the art that variations and modifications can be effected within the spirit and scope of the invention.

I claim:

1. A clear coating composition comprising from about 90 to about 100 parts by weight of a base resin; from 0 to about 2 parts by weight of an adhesion promoter; and from about 3 to about 8 parts by weight of a cationic polymerization initiator, wherein said base resin comprises:
    (A) from about 30 to about 50 parts by weight of a cycloaliphatic epoxy functional siloxane monomer having structure (IA)

(IA)

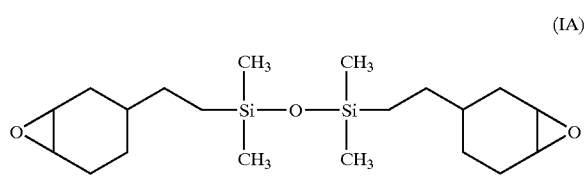

(B) from about 5 to about 30 parts by weight of a cycloaliphatic epoxy functional siloxane oligomer having structure (IB)

(IB)

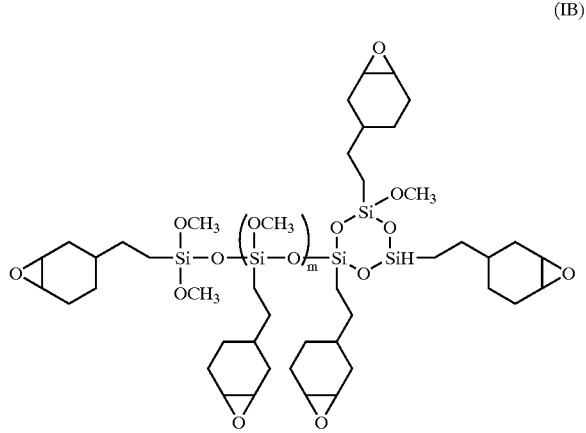

wherein m is an integer having a value from 5 to 50;

(C) from about 20 to about 50 parts by weight of at least one non-silicon-containing epoxy resin selected from the group consisting of (i) epoxidized vegetable oils, (ii) epoxidized vegetable oil esters, and (iii) 3,4-epoxycyclohexylmethyl-3',4'-epoxycyclohexane carboxylate having structure (IIA)

(IIA)

[structure]

(D) from 0 to about 30 parts by weight of one or more flexibilizers selected from the group of (i) epoxides based on a diglycidyl ether of bisphenol A having structure (IIB)

(IIB)

[structure]

-continued

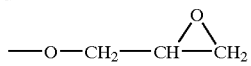

wherein the average value of n is 0 or about 0.07, 0.14, 2.3 or 4.8; (ii) epoxidized alpha olefins; (iii) limonene oxides; (iv) thermoplastic acrylic resins; (v) elastomers; (vi) phenoxy resins; (vii) polyol flexibilizers; and (viii) allyl ethers; and wherein said cationic polymerization initiator comprises at least one diaryliodonium salt, wherein each said diaryliodonium salt is present in a corresponding separate catalyst solution comprising from about 40 to about 80 wt. % of a carrier medium and from about 20 to about 60 wt. % of said diaryliodonium salt, and wherein each said diaryliodonium salt has structure (III)

(III)

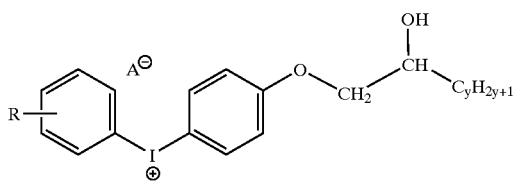

wherein R is methyl or hydrogen; y is 0 or an integer from 1 to 25; and A⁻ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

2. The clear coating composition of claim 1, wherein said adhesion promoter is 3-glycidyloxypropyltrimethoxysilane or 2-(3,4-epoxycyclohexyl)-ethyl trimethoxysilane.

3. The clear coating composition of claim 1, wherein said cationic polymerization initiator comprises:

(A) from 0 to about 8 parts by weight of a phosphate catalyst solution comprising from about 20 to about 60 wt. % of at least one diaryliodonium phosphate salt selected from the group consisting of [4-(2-hydroxy-1-tetradecyloxy)-phenyl]phenyliodonium hexafluorophosphate having structure (IIIA) and [4-(2-hydroxy-1-tetradecyloxy)-phenyl] 4-methylphenyliodonium hexafluorophosphate having structure (IIIB)

(IIIA)

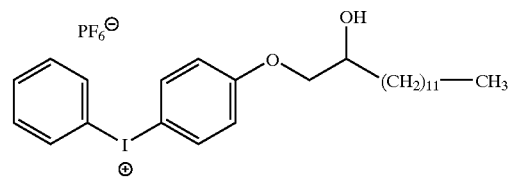

(IIIB)

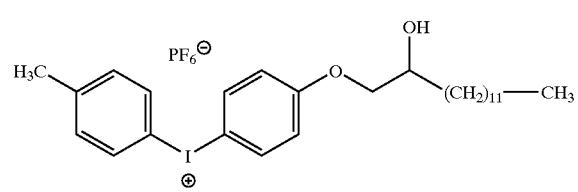

wherein each said at least one selected diaryliodonium phosphate salt is in solution with from about 40 to about 80 wt. % of said carrier medium, wherein said carrier medium is selected from the group of 3,4- epoxycyclohexylmethyl-3',4'-epoxycyclohexane carboxylate and bis(3,4-epoxycyclohexyl)adipate; and (B) from 0 to about 4 parts by weight of an antimonate catalyst solution comprising from about 20 to about 60 wt. % of at least one iodonium antimonate salt selected from the group of [4-(2-hydroxy-1-tetradecyloxy) phenyl]phenyliodonium hexafluoroantimonate having structure (IIIC) and [4-(2-hydroxy-1-tetradecyloxy)-phenyl] 4-methylphenyliodonium hexafluoroantimonate having structure (IIID)

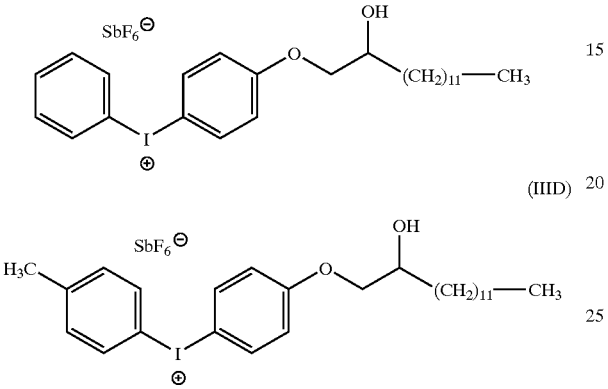

wherein each said at least one selected iodonium antimonate salt is in solution with from about 40 to about 80 wt. % of said carrier medium wherein said carrier medium is selected from the group consisting of 3,4-epoxycyclohexylmethyl-3',4'-epoxycyclohexane carboxylate and bis(3,4-epoxycyclohexyl) adipate.

4. The clear coating composition of claim 3, wherein (A) said iodonium phosphate catalyst solution comprises about 40 wt. % of each said at least one selected diaryliodonium phosphate salt having structure (IIIA) or (IIIB) and about 60 wt. % of said 3,4-epoxycyclohexylmethyl-3',4'-epoxycyclohexane carboxylate; and (B) said iodonium antimonate catalyst solution comprises about 40 wt. % of each said at least one selected diaryliodonium antimonate salt having structure (IIIC) or (IIID) and about 60 wt. % of said 3,4-epoxycyclohexylmethyl-3',4'-epoxycyclohexane carboxylate.

5. The clear coating composition of claim 4, wherein said cationic polymerization initiator comprises:

(A) about 4 parts by weight of said iodonium phosphate catalyst solution; and (B) about 2 parts by weight of said iodonium antimonate catalyst solution.

6. The clear coating composition of claim 4, wherein said cationic polymerization initiator comprises:

(A) about 3 parts by weight of said iodonium phosphate catalyst solution; and (B) about 1 part by weight of said iodonium antimonate catalyst solution.

7. The clear coating composition of claim 4, wherein said cationic polymerization initiator comprises equal parts by weight of said iodonium phosphate catalyst solution and of said iodonium antimonate catalyst solution, wherein the amount of each said catalyst solution ranges from about 2 to about 4 parts by weight.

8. The clear coating composition of claim 4, wherein said cationic polymerization initiator comprises:

(A) 0 parts by weight of said iodonium phosphate catalyst solution; and (B) from about 2 to about 4 parts by weight of said iodonium antimonate catalyst solution.

9. The clear coating composition of claim 4, wherein said cationic polymerization initiator comprises:

(A) from about 4 to about 8 parts by weight of said iodonium phosphate catalyst solution; and (B) 0 parts by weight of said iodonium antimonate catalyst solution.

10. The clear coating composition of claim 3, wherein said base resin comprises:

(A) from about 35 to about 40 parts by weight of said cycloaliphatic epoxy functional siloxane monomer having structure (IA);

(B) from about 5 to about 15 parts by weight of said cycloaliphatic epoxy functional siloxane oligomer having structure (IB);

(C) from about 28 to about 40 parts by weight of said at least one non-silicon-containing epoxy resin; and (D) from about 9 to about 17 parts by weight of said epoxide based on a diglycidyl ether of bisphenol A having structure (IIB).

11. The clear coating composition of claim 10, wherein (A) said iodonium phosphate catalyst solution comprises about 40 wt. % of each said at least one selected diaryliodonium phosphate salt having structure (IIIA) or (IIIB) and about 60 wt. % of said 3,4-epoxycyclohexylmethyl-3',4'-epoxycyclohexane carboxylate; and (B) said iodonium antimonate catalyst solution comprises about 40 wt. % of each said at least one selected diaryliodonium antimonate salt having structure (IIIC) or (IIID) and about 60 wt. % of said 3,4-epoxycyclohexylmethyl-3',4'-epoxycyclohexane carboxylate.

12. A method for manufacturing a coated article comprising:

(A) applying said composition of claim 1 to an article comprising wood, glass, plastic, or metal; and (B) exposing said article and applied composition to E-beam radiation ranging from about 3 to about 12 Mrad or heating said article and applied composition to a first maximum substrate temperature ranging from about 150° C. to about 260° C., whereby polymerization occurs to >90% during said exposure to E-beam radiation or during said heating to said first maximum substrate temperature.

13. The method of claim 12 additionally comprising after step (B) the step of:

(C) heating said exposed or heated article and applied composition to a second maximum substrate temperature ranging from about 80° C. to about 125° C.

14. A coated article manufactured by said method of claim 12.

15. A coating composition comprising from about 35 to about 62 parts by weight of a base resin; from about 32 to about 65 parts by weight of one or more components selected from the group consisting of fillers, pigments, diluents, tougheners, flow control agents, and antifoaming agents; from 0 to about 1 part by weight of an adhesion promoter; and from about 2 to about 5 parts by weight of a cationic polymerization initiator, wherein said base resin comprises:

(A) from about 30 to about 50 parts by weight of a cycloaliphatic epoxy functional siloxane monomer having structure (IA)

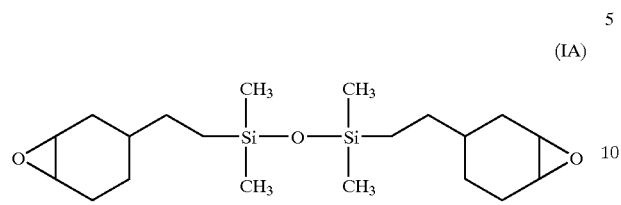
(IA)

(B) from about 5 to about 30 parts by weight of a cycloaliphatic epoxy functional siloxane oligomer having structure (IB)

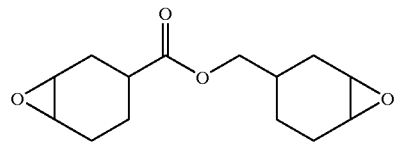
(IIA)

and (D) from 0 to about 30 parts by weight of one or more flexibilizers selected from the group of (i) epoxides based on a diglycidyl ether of bisphenol A having structure (IIB)

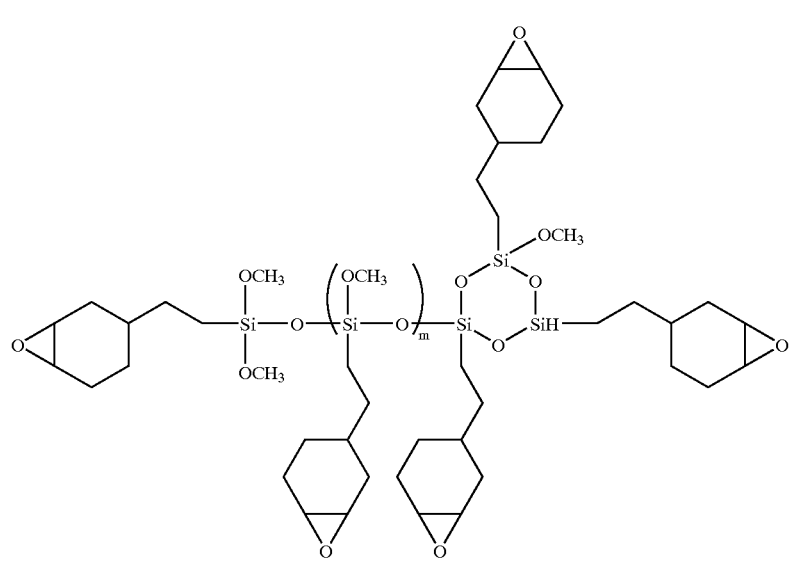
(IB)

wherein m is an integer having a value from 5 to 50;

(C) from about 20 to about 50 parts by weight of at least one non-silicon-containing epoxy resin selected from the group consisting of (i) epoxidized vegetable oils, (ii) epoxidized vegetable oil esters, and (iii) 3,4-epoxycyclohexylmethyl-3',4'-epoxycyclohexane carboxylate having structure (IIA)

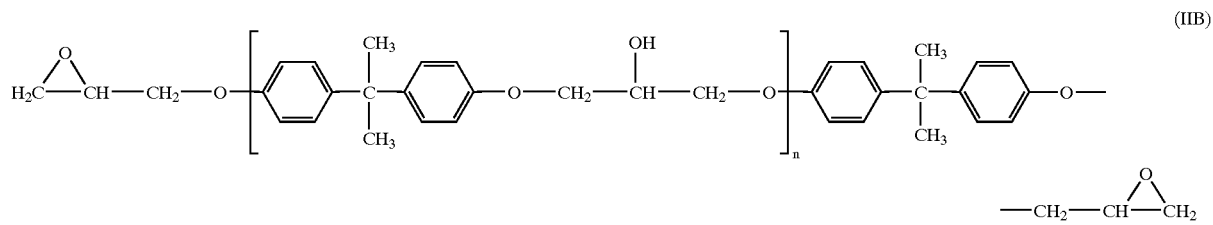
(IIB)

wherein the average value of n is 0 or about 0.07, 0.14, 2.3 or 4.8; (ii) epoxidized alpha olefins; (iii) limonene oxides; (iv) thermoplastic acrylic resins; (v) elastomers; (vi) phenoxy resins; (vii) polyol flexibilizers; and (viii) allyl ethers; and
wherein said cationic polymerization initiator comprises at least one diaryliodonium salt, wherein each said diaryliodonium salt is present in a corresponding separate catalyst solution comprising from about 40 to about 80 wt. % of a carrier medium and from about 20 to about 60 wt. % of said diaryliodonium salt, and wherein each said diaryliodonium salt has structure (III)

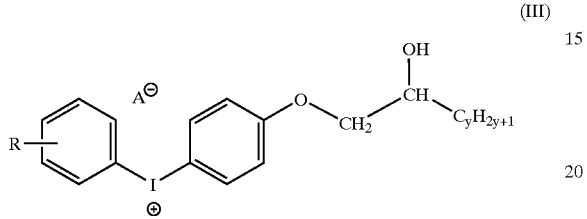

(III)

wherein R is methyl or hydrogen; y is 0 or an integer from 1 to 25; and $A^-$ is a non-nucleophilic anion selected from the group consisting of $[BF_4]^-$, $[PF_6]^-$, $[AsF_6]^-$, $[SbF_6]^-$, $[B(C_6F_5)_4]^-$, and $[Ga(C_6F_5)_4]^-$.

16. The coating composition of claim 15, wherein said adhesion promoter is 3-glycidyloxypropyltrimethoxysilane or 2-(3,4-epoxycyclohexyl)-ethyl trimethoxysilane.

17. The coating composition of claim 15, wherein said cationic polymerization initiator comprises:
(A) from 0 to about 4.4 parts by weight of a phosphate catalyst solution comprising from about 20 to about 60 wt. % of at least one diaryliodonium phosphate salt selected from the group consisting of [4-(2-hydroxy-1-tetradecyloxy)-phenyl]phenyliodonium hexafluorophosphate having structure (IIIA) and [4-(2-hydroxy-1-tetradecyloxy)-phenyl] 4-methylphenyliodonium hexafluorophosphate having structure (IIIB)

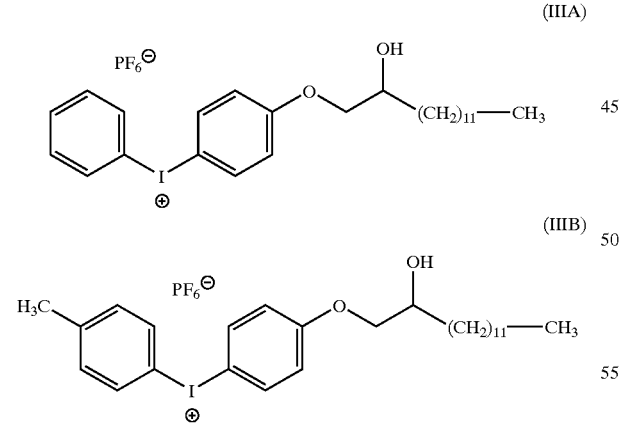

wherein each said at least one selected diaryliodonium phosphate salt is in solution with from about 40 to about 80 wt. % of said carrier medium, wherein said carrier medium is selected from the group consisting of 3,4-epoxycyclohexylmethyl-3',4'-epoxycyclohexane carboxylate and bis(3,4-epoxycyclohexyl)adipate; and and
(B) from 0 to about 4 parts by weight of an antimonate catalyst solution comprising from about 20 to about 60 wt. % of at least one iodonium antimonate salt selected from the group of [4-(2-hydroxy-1-tetradecyloxy) phenyl]phenyliodonium hexafluoroantimonate having structure (IIIC) and [4-(2-hydroxy-1-tetradecyloxy)-phenyl] 4-methylphenyliodonium hexafluoroantimonate having structure (IIID)

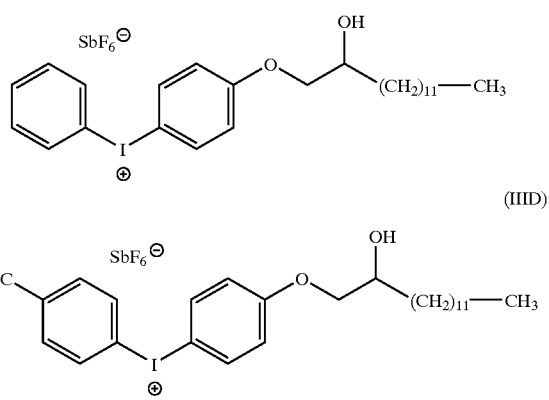

wherein each said at least one selected iodonium antimonate salt is in solution with from about 40 to about 80 wt. % of said carrier medium wherein said carrier medium is selected from the group consisting of 3,4-epoxycyclohexylmethyl-3',4'-epoxycyclohexane carboxylate and bis(3,4-epoxycyclohexyl)adipate.

18. The coating composition of claim 17, wherein said base resin comprises
(A) from about 40 to about 45 parts by weight of said cycloaliphatic epoxy functional siloxane monomer having structure (IA);
(B) from about 5 to about 15 parts by weight of said cycloaliphatic epoxy functional siloxane oligomer having structure (IB);
(C) from about 32 to about 40 parts by weight of said at least one non-silicon-containing epoxy resin; and
(D) from about 5 to about 10 parts by weight of said epoxide based on a diglycidyl ether of bisphenol A having structure (IIB).

19. The coating composition of claim 18, wherein
(A) said iodonium phosphate catalyst solution comprises about 40 wt. % of each said at least one selected diaryliodonium phosphate salt having structure (IIIA) or (IIIB) and about 60 wt. % of said 3,4-epoxycyclohexylmethyl-3',4'-epoxycyclohexane carboxylate; and
(B) said iodonium antimonate catalyst solution comprises about 40 wt. % of each said at least one selected diaryliodonium antimonate salt having structure (IIIC) or (IIID) and about 60 wt. % of said 3,4-epoxycyclohexylmethyl-3',4'-epoxycyclohexane carboxylate.

20. The coating composition of claim 17, wherein
(A) said iodonium phosphate catalyst solution comprises about 40 wt. % of each said at least one selected diaryliodonium phosphate salt having structure (IIIA) or (IIIB) and about 60 wt. % of said 3,4-epoxycyclohexylmethyl-3',4'-epoxycyclohexane carboxylate; and
(B) said iodonium antimonate catalyst solution comprises about 40 wt. % of each said at least one selected diaryliodonium antimonate salt having structure (IIIC) or (IIID) and about 60 wt. % of said 3,4-epoxycyclohexylmethyl-3',4'-epoxycyclohexane carboxylate.

21. The coating composition of claim 20, wherein said cationic polymerization initiator comprises equal parts by weight of said iodonium phosphate catalyst solution and of said iodonium antimonate catalyst solution, wherein the amount of each said catalyst solution ranges from about 1 to about 2.5 parts by weight.

22. The coating composition of claim 20, wherein said cationic polymerization initiator comprises:
   (A) about 3 parts by weight of said phosphate catalyst solution; and
   (B) about 1 part by weight of said antimonate catalyst solution.

23. The coating composition of claim 20, wherein said cationic polymerization initiator comprises:
   (A) 0 parts by weight of said phosphate catalyst solution; and
   (B) from about 2 to about 4 parts by weight of said antimonate catalyst solution.

24. The coating composition of claim 20, wherein said cationic polymerization initiator comprises:
   (A) from about 2 to about 4 parts by weight of said phosphate catalyst solution; and
   (B) 0 parts by weight of said antimonate catalyst solution.

25. A method for manufacturing a coated article comprising:
   (A) applying said composition of claim 15 to an article comprising wood, glass, plastic, or metal; and
   (B) exposing said article and applied composition to E-beam radiation ranging from about 3 to about 12 Mrad or heating said article and applied composition to a first maximum substrate temperature ranging from about 150° C. to about 260° C., whereby polymerization occurs to >90% during said exposure to E-beam radiation or during said heating to said first maximum substrate temperature.

26. The method of claim 25 additionally comprising after step (B) the step of:
   (C) heating said exposed or heated article and applied composition to a second maximum substrate temperature ranging from about 80° C. to about 125° C.

27. A coated article manufactured by said method of claim 25.

* * * * *